United States Patent
Liao et al.

(10) Patent No.: US 11,481,869 B2
(45) Date of Patent: Oct. 25, 2022

(54) CROSS-DOMAIN IMAGE TRANSLATION

(71) Applicant: Microsoft Technology Licensing, LLC, Redmond, WA (US)

(72) Inventors: Jing Liao, Redmond, WA (US); Lu Yuan, Beijing (CN); Kaidi Cao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/278,652

(22) PCT Filed: Sep. 5, 2019

(86) PCT No.: PCT/US2019/049619
§ 371 (c)(1),
(2) Date: Mar. 22, 2021

(87) PCT Pub. No.: WO2020/091891
PCT Pub. Date: May 7, 2020

(65) Prior Publication Data
US 2022/0044352 A1 Feb. 10, 2022

(30) Foreign Application Priority Data
Oct. 31, 2018 (CN) .......................... 201811294026.6

(51) Int. Cl.
G06T 3/00 (2006.01)
G06N 20/20 (2019.01)
G06K 9/62 (2022.01)

(52) U.S. Cl.
CPC .......... *G06T 3/0093* (2013.01); *G06K 9/6247* (2013.01); *G06N 20/20* (2019.01); *G06T 3/0012* (2013.01)

(58) Field of Classification Search
CPC ..... G06T 3/0093; G06T 3/0012; G06T 11/00; G06K 9/6247; G06N 20/20; G06N 3/0445; G06N 3/0454; G06N 3/084
See application file for complete search history.

(56) References Cited

U.S. PATENT DOCUMENTS 7,483,553 B2    1/2009 Xu et al.
9,646,195 B1 *  5/2017 Kim ..................... G06V 40/172
(Continued)

FOREIGN PATENT DOCUMENTS

CN    102096934 A    6/2011
CN    106548208 A    3/2017

OTHER PUBLICATIONS

Han et al., DeepSketch2Face: A Deep Learning Based Sketching System for 3D Face and Caricature Modeling, 2017 (Year: 2017).*
(Continued)

*Primary Examiner* — Phong X Nguyen
(74) *Attorney, Agent, or Firm* — Schwegman Lundberg & Woessner, P.A.

(57) ABSTRACT

Implementations of the present disclosure provide a solution for cross-domain image translation. In this solution, a first learning network for geometric deformation from a first to a second image domain is determined based on first and second images in the first and second domains, images in the two domains having different styles and objects in the images having geometric deformation with respect to each other. Geometric deformation from the second to the first domains is performed on the second image or geometric deformation from the first to the second domains is performed on the first image, to generate an intermediate image. A second learning network for style transfer from the first to the second domains is determined based on the first and intermediate images or based on the second and intermediate images generated. Accordingly, processing accuracy of lean- (Continued)

ing networks for cross-domain image translation can be improved and complexity is lowered.

12 Claims, 8 Drawing Sheets

(56) References Cited

U.S. PATENT DOCUMENTS

| | | | | |
|---|---|---|---|---|
| 10,366,306 | B1* | 7/2019 | Raghavan | G06V 10/751 |
| 10,430,455 | B2* | 10/2019 | Jin | G06F 16/532 |
| 10,504,267 | B2* | 12/2019 | Simons | G06T 5/50 |
| 10,748,314 | B2 | 8/2020 | Hua et al. | |
| 10,916,001 | B2* | 2/2021 | Lu | G06T 5/20 |
| 2005/0286799 | A1* | 12/2005 | Huang | G06V 40/162 345/646 |
| 2018/0150947 | A1* | 5/2018 | Lu | G06T 11/00 |
| 2018/0307947 | A1 | 10/2018 | Choi et al. | |
| 2018/0357259 | A1* | 12/2018 | Jin | G06N 3/0427 |
| 2018/0357800 | A1* | 12/2018 | Oxholm | G06T 11/001 |
| 2019/0220746 | A1* | 7/2019 | Liu | G06K 9/62 |
| 2019/0251721 | A1* | 8/2019 | Hua | G06N 3/08 |
| 2020/0034654 | A1* | 1/2020 | Mansi | G06N 20/20 |
| 2020/0074589 | A1* | 3/2020 | Stent | G06K 9/6274 |
| 2020/0160494 | A1* | 5/2020 | Hwang | G06N 3/08 |
| 2022/0017858 | A1* | 1/2022 | Zheng | G01N 21/6452 |
| 2022/0044352 | A1* | 2/2022 | Liao | G06K 9/6247 |
| 2022/0058420 | A1* | 2/2022 | Peng | G06V 10/82 |

OTHER PUBLICATIONS

Akleman, Ergun, "Making Caricatures with Morphing", In Visual Proceedings: The Art and Interdisciplinary Programs of SIGGRAPH, August 3, 1997, 2 Pages.

Akleman, et al., "Making Extreme Caricatures with a New interactive 2D Deformation Technique with Simplicial Complexes", In Proceedings of Visual, vol. 1, Sep. 2000, 12 Pages.

Brennan, Susane., "Caricature Generator: The Dynamic Exaggeration of Faces by Computer", In Journal of Leonardo, vol. 40, Issue 4, Aug. 1, 2007, pp. 392-400.

Cao, et al., "CariGANs: Unpaired Photo-to-Caricature Translation", In Repository of arXiv:1811.00222v1, Nov. 1, 2018, 14 Pages.

Chen, et al., "CartoonGAN: Generative Adversarial Networks for Photo Cartoonization", In Proceedings of IEEE/CVF Conference on Computer Vision and Pattern Recognition, Jun. 18, 2018, 10 Pages.

Chen, et al., "PicToon: A Personalized Image-based Cartoon System", In Proceedings of Tenth ACM International Conference on Multimedia, Dec. 1, 2002, pp. 171-178.

Chen, et al., "StyleBank: An Explicit Representation for Neural Image Style Transfer", In Proceedings of IEEE Conference on Computer Vision and Pattern Recognition, Jul. 21, 2017, pp. 1897-1906.

Cole, et al., "Synthesizing Normalized Faces from Facial Identity Features", In Proceedings of Conference on Computer Vision and Pattern Recognition, Jul. 21, 2017, pp. 3386-3395.

Gatys, et al., "A Neural Algorithm of Artistic Style", In Repository of arXiv:1508.06576v1, Aug. 26, 2015, 16 Pages.

Gooch, et al., "Human Facial Illustrations: Creation and Psychophysical Evaluation", In Journal of ACM Transactions on Graphics, vol. 23, Issue 1, Jan. 2004, pp. 27-44.

Han, et al., "CaricatureShop: Personalized and Photorealistic Caricature Sketching", In Repository of arXiv: 1807.09064v1, Jul. 24, 2018, 12 Pages.

Hinton, et al., "Reducing the Dimensionality of Data with Neural Networks", In Journal of Science, vol. 313, Jul. 28, 2006, pp. 504-507.

Huang, et al., "Multimodal Unsupervised Image-to-Image Translation", In Repository of arXiv:1804.04732v1, Apr. 12, 2018, 22 Pages.

Isola, et al., "Image-to-Image Translation with Conditional Adversarial Networks", In Proceedings of IEEE Conference on Computer Vision and Pattern Recognition, Jul. 21, 2017, pp. 1125-1134.

Johnson, et al., "Perceptual Losses for Real-Time Style Transfer and Super-Resolution", In Proceedings of European Conference on Computer Vision, Oct. 11, 2016, pp. 694-711.

Karras, et al., "Progressive Growing of GANs for improved Quality, Stability, and Variation", In Repository of arXiv:1710.10196v1, Oct. 27, 2017, 25 Pages.

Kim, et al., "Learning to Discover Cross-Domain Relations with Generative Adversarial Networks", In Repository of arXiv:1703.05192v1, Mar. 15, 2017, 10 Pages.

Kingma, et al., "Adam: A Method for Stochastic Optimization", In Repository of arXiv:1412.6980v1, Dec. 22, 2014, 9 Pages.

Koshimizu, et al., "On KANSEI Facial Image Processing for Computerized Facial Caricaturing System PICASSO", In Proceedings of IEEE International Conference on Systems, Man, and Cybernetics, Oct. 12, 1999, pp. 294-299.

Liang, et al., "Example-based Caricature Generation with Exaggeration", In Proceedings of 10th Pacific Conference on Computer Graphics and Applications, Oct. 9, 2002, 8 Pages.

Liao, et al., "Visual Attribute Transfer through Deep Image Analogy", In Repository of arXiv:1705.01088v1, May 2, 2017, 16 Pages.

Liu, et al., "Auto-painter: Cartoon Image Generation from Sketch by Using Conditional Generative Adversarial Networks", In Repository of arXiv: 1705.01908v2, May 7, 2017, 12 Pages.

Liu, et al., "Deep Learning Face Attributes in the Wild", In Proceedings of the IEEE International Conference on Computer Vision, Dec. 7, 2015, pp. 3730-3738.

Liu, et al., "Domain-Adaptive Generative Adversarial Networks for Sketch-to-Photo Inversion", In Proceedings of 27th International Workshop on Machine Learning for Signal Processing, Sep. 25, 2017, 6 Pages.

Liu, et al., "NVlabs/MUNIT: Multimodal Unsupervised Image-to-Image Translation", Retrieved From: https://web.archive.org/web/20180429195616/https://github.com/nvlabs/munit, Apr. 29, 2018, 4 Pages.

Liu, et al., "Unsupervised Image-to-Image Translation Networks", In Proceedings of 31st Conference on Neural Information Processing Systems, Dec. 4, 2017, 9 Pages.

Mo, et al., "Improved Automatic Caricature by Feature Normalization and Exaggeration", In Proceedings of International Conference on Computer Graphics and Interactive Techniques, Aug. 8, 2004, 1 Page.

"International Search Report and Written Opinion Issued in PCT Application No. PCT/US19/049619", dated Nov. 27, 2019, 11 Pages.

Royer, et al., "XGAN: Unsupervised Image-to-Image Translation for Many-to-Many Mappings", In Repository of arXiv:1711.05139v1, Nov. 14, 2017, 13 Pages.

Shet, et al., "Use of Neural Networks in Automatic Caricature Generation: An Approach Based on Drawing Style Capture", In Proceedings of the Second Iberian Conference on Pattern Recognition and Image Analysis, Jun. 7, 2005, 7 Pages.

Shum, et al., "Sample Based Face Caricature Generation", In Technical Report MSR-TR-2004-35, Apr. 2004, 9 Pages.

Simonyan, et al., "Very Deep Convolutional Networks for Large-Scale Image Recognition", In Repository of arXiv:1409.1556v1, Sep. 4, 2014, 10 Pages.

Sziranyi, et al., "Markov Random Field Image Segmentation Using Cellular Neural Network", In Journal of IEEE Transactions on Circuits and Systems I: Fundamental Theory and Applications, vol. 44, Issue 1, Jan. 1997, pp. 86-89.

Taigman, et al., "Unsupervised Cross-Domain Image Generation", In Repository of arXiv:1611.02200v1, Nov. 7, 2016, 14 Pages.

Tseng, et al., "Synthesis of Exaggerative Caricature with Inter and Intra Correlations", In Proceedings of 8th Asian Conference on Computer Vision, Nov. 18, 2007, pp. 314-323.

Yi, et al., "DualGAN: Unsupervised Dual Learning for Image-to-Image Translation", In Repository of arXiv:1704.02510v1, Apr. 8, 2017, 9 Pages.

(56) References Cited

OTHER PUBLICATIONS

Zheng, et al., "Unpaired Photo-to-Caricature Translation on Faces in the Wild", In Repository of arXiv:1711.10735v2, Jul. 26, 2018, 28 Pages.
Zhu, et al., "junyanz/CycleGAN: Software that can Generate Photos from Paintings, turn Horses into Zebras, Perform Style Transfer, and More", Retrieved From: https://web.archive.org/web/20181005102206/https://github.com/junyanz/CycleGAN, Oct. 5, 2018, 8 Pages.
Zhu, et al., "Toward Multimodal Image-to-Image Translation", In Proceedings of 31st Conference on Neural Information Processing Systems, Dec. 4, 2017, 12 Pages.
Zhu, et ai., "Unconstrained Face Alignment via Cascaded Compositional Learning", In Proceedings of the IEEE Conference on Computer Vision and Pattern Recognition, Jun. 27, 2016, pp. 3409-3417.
Zhu, et al., "Unpaired Image-to-Image Translation using Cycle-Consistent Adversarial Networks", In Proceedings of the IEEE International Conference on Computer Vision, Oct. 22, 2017, pp. 2223-2232.

\* cited by examiner

CROSS-DOMAIN IMAGE TRANSLATION

CROSS-REFERENCE TO RELATED APPLICATION

This application is a U.S. National Stage Filing under 35 U.S.C. 371 of International Patent Application Serial No. PCT/US2019/049619, filed Sep. 5, 2019, and published as WO 2020/091891 A1 on May 7, 2020, which claims priority to Chinese Application No. 201811294026.6, filed Oct. 31, 2018, which applications and publication are incorporated herein by reference in their entirety.

BACKGROUND

Image translation refers to translating a source image into an image with a different style. Different image types may be considered as different image domains. For example, photos, cartoons, caricatures, oil paintings, sketches, and watercolor may be considered as different image domains. Style and/or geometric deformation represented in images of different domains are usually different.

Currently there are many image translation techniques that enable cross-domain image translation. However, most of the image translation techniques focus on transferring a style of a source image to other desired styles while the content presented in the image is retained substantially. For example, a photo may be translated into a sketch-style image, but the shape of the object in the image remains substantially the same. In some cases, if it is desired to translate a source image to a target image with a different geometry presentation, e.g., translate a photo showing a real person into a caricature image with exaggerated deformation or vice versa, simply translating the style of the photo will not be enough to present the effect of the caricature.

SUMMARY

In accordance with implementations of the subject matter described herein, there is provided a solution for cross-domain image translation. In this solution, a first learning network for geometric deformation from a first image domain to a second image domain is determined based on a first image in the first image domain and a second image in the second image domain, images in the first and second image domains having different styles and objects in the images having geometric deformation with respect to each other. Geometric deformation from the second image domain to the first image domain is performed on the second image to generate an intermediate image which inherits a same style as the second image, or geometric deformation from the first image domain to the second image domain is performed on the first image to generate an intermediate image which inherits a same style as the first image. A second learning network for style transfer from the first image domain to the second image domain is determined based on the first image and the intermediate image generated from the second image or based on the second image and the intermediate image generated from the first image. Through this solution, the processing accuracy of the learning network for cross-domain image translation can be improved and the complexity is reduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

Figure 1:
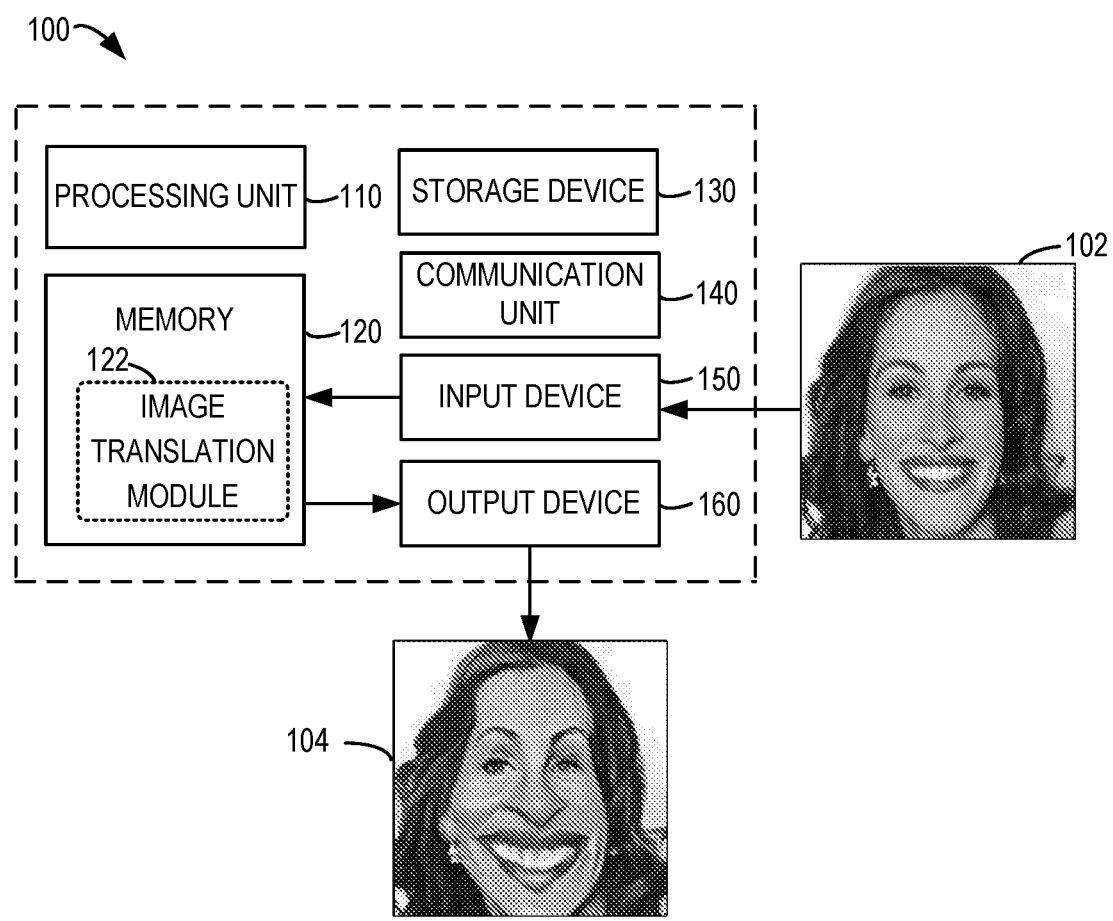
FIG. 1 illustrates a block diagram of a computing environment in which various implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

As mentioned above, cross-domain image translation may involve translation between image domains having different geometric representations. A typical example is translation of a photo to a caricature image or vice versa. A caricature can be defined as an art of drawing objects in a simple or exaggerated way. A caricature usually focuses on sketching the face of the sketched object, especially the face of a person. The caricature is characterized by making some parts of the object to present exaggerated shapes, thereby achieving entertainment effects of humor or sarcasm. Thus, a geometry of an object in the caricature has a deforming effect as compared to a geometry of an object in an image such as a real photo. Caricatures are usually drawn by artists in daily life. The artists have the ability to capture distinctive features of specific objects and to exaggerate these features when drawing caricatures.

There have been attempts to develop automated image translation techniques for translating images in other image domains into caricatures. One solution is to provide a deformation system that allows a user to manipulate image deformation. This kind of method requires the user to expertise knowledge and probably detailed involvement of experienced artists. There is another solution to determine some exaggeration rules applied in the process of drawing the caricatures by the artists, for example, emphasizing the nose, eyes and/or mouth on the face, and then apply these exaggeration rules to transform a source image into a caricature. However, this solution is limited to a specific art form (for transforming sketches or some cartoons), and the exaggeration in the transformed caricatures simply follows the predetermined rules and cannot exhibit distinguishing features of different objects.

In recent years, the deep learning technique (also known as machine learning) has been successfully used in image translation. The deep learning-based solution utilizes training images to train a learning model to enable the learning model to translate an image in an image domain into an image in another image domain. However, it is very challenging to apply the deep learning technique to image translation involving the caricature domain.

First, most images do not have paired caricature versions. For example, corresponding caricature images are generally unavailable for many photos. It is very time consuming and costly for the artists to create a corresponding caricature version for each photo. Therefore, it is difficult to train a learning model using a supervised learning approach.

On the other hand, the key to generate caricature images lies on geometry exaggeration and style transfer. However, many learning models usually focus on style transfer with the content presented in the image remains substantially unchanged. This means that geometries of objects in the image would not change significantly. There are some unsupervised cross-domain image translation approaches proposed, which in principle enable learning models to be trained to learn both geometric deformation and style transfer simultaneously. However, the large gap of shape and style between the caricature domain and other image domains imposes a big challenge to these leaning models, and thus the learning models always output unpleasant results.

Example Environment

The basic principles and several example implementations of the subject matter described herein are described below with reference to the figures. FIG. 1 illustrates a block diagram of a computing device 100 in which various implementations of the subject matter described herein can be implemented. It would be appreciated that the computing device 100 shown in FIG. 1 is merely for purpose of illustration, without suggesting any limitation to the functions and scopes of the implementations of the subject matter described herein in any manner. As shown in FIG. 1, the computing device 100 includes a general-purpose computing device 100. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, multiple processing units execute computer executable instructions in parallel so as to improve the parallel processing capability of the computing device 100. The processing unit 110 may also be referred to as a central processing unit (CPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 130 may be any detachable or non-detachable medium and may include a machine-readable medium such as a memory, flash memory drive, magnetic disk or another other media, which can be used for storing information and/or data and can be accessed in the computing device 100.

The computing device 100 may further include additional detachable/non-detachable, volatile/non-volatile memory medium. Although not shown in FIG. 1, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 140 communicates with a further computing device via the communication medium. In addition, the functions of the components in the computing device 100 can be implemented by a single computing cluster or multiple computing machines that can communicate via communication connections. Therefore, the computing device 100 can operate in a networked environment using a logical connection with one or more other servers, networked personal computers (PCs) or further general network nodes.

The input device 150 may be one or more of a variety of input devices, such as a mouse, keyboard, tracking ball, voice-input device, and the like. The output device 160 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some implementations, as an alternative of being integrated on a single device, some or all components of the computing device 100 may also be arranged in cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 100 may be used to implement cross-domain image translation in various implementations of the subject matter described herein. Therefore, hereinafter, the computing device is also referred to as a "image processing device 100." The memory 120 may include one or more image translation modules 122 having one or more program instructions. These modules are accessible and executable by the processing unit 110 to perform the functionalities of the various implementations described herein.

When performing the image translation, the image processing device 100 can receive a source image 102 through an input device 150. The source image 102 obtained by the input device 150 is provided as an input to the image translation module 122. The image translation module 122 performs cross-domain image translation on the source image 102. In this disclosure, it is desired to perform translation in aspects of both the style and geometry of the image. Such image translation is suitable for translating from any other image domains to a caricature domain, or from the caricature domain to other image domains. In the example of FIG. 1, the image translation module 122 translates the source image 102 in the photo domain into a target image 104 in the caricature domain. The output device 160 may present the target image 104 to a viewer or transmit the target image 104 to other devices.

It should be appreciated that the source image 102 and the target image 104 illustrated in FIG. 1 are for purpose of illustration only. In other examples, any source image may be processed and may generate different target images in the caricature form. In some implementations, the image translation module 122 may further be designed to translate the source image in the caricature form into other target images without the shape exaggeration effect.

Working Principle

According to implementations of the subject matter described herein, a solution for cross-domain image translation is proposed. In this solution, cross-domain image translation is explicitly divided into two tasks, i.e., geometric deformation and style transfer.

In a first implementation, the geometric deformation and the style transfer are performed on a source image to be translated, respectively, and a target image is obtained based on the results of the two tasks. Specifically, the geometric deformation causes a first geometry of an object in the source image to be deformed to a second geometry. The style transfer causes the source image with a first style to transfer to an intermediate image with a second style. Then the intermediate image is transferred to the target image based on the second geometry. The target image has the second style and objects therein have the second geometry after deformation. According to this solution, the complicated problem of cross-domain image translation is solved by two parallel tasks of geometric deformation and style transfer. This may improve the processing accuracy and reduce the complexity. Therefore, the obtained target image highly conforms to the characteristics of the desired image domain in aspects of geometric deformation and style.

The two tasks of geometric deformation and style transfer in the first implementation can be implemented by learning networks. In a determination phase for the learning networks, images in the first image domain and the second image domain are used to determine a first learning network for geometric deformation. To determine a second learning network for style transfer, geometric deformation from the second image domain to the first image domain is performed on an image in the second domain to generate an intermediate image that has the geometry of the first image domain and inherits the style in the second image domain. The intermediate image is used together with the image in the first image domain to determine the second learning network. During the process of determining the learning networks, by determining the learning network for the style transfer with the introduction of the intermediate image, it is possible to neutralize the geometric difference between the images of the two image domains, such that the second learning network is able to focus on learning the style transfer.

In a second implementation, when performing the two tasks of geometric deformation and style transfer, the geometric deformation is first performed on a source image to be transformed, and then style transfer is performed on the basis of the geometric deformation to obtain a target image. Specifically, the geometric deformation causes a first geometry of an object in the source image to deform to a second geometry. The source image is transformed based on the second geometry to generate an intermediate image that inherits a same first style as the source image. Then the style transfer is performed on the intermediate image to transform the intermediate image having the first style into a target image having a second style. According to this solution, the complicated cross-domain image translation is implemented by the two tasks of geometric deformation and style transfer performed sequentially. This may improve the processing accuracy and reduce the complexity. Therefore, the obtained target image highly conforms to the characteristics of the desired image domain in aspects of geometric deformation and style.

The above geometric deformation and style transfer tasks performed sequentially may also be implemented by learning networks. In a determination phase for the learning networks, a first learning network for geometric deformation is determined in a way similar to that in the first implementation. To determine a second learning network for style transfer, geometric deformation from the first image domain to the second image domain is performed on an image in the first image domain to generate an intermediate image which inherits the style in the first image domain. The intermediate image is used together with the image in the second image domain to determine the second learning network. During the process of determining the learning networks, by determining the learning network for the style transfer with the introduction of the intermediate image, it is possible to neutralize the geometric difference between the images of the two image domains, such that the second learning network is able to focus on learning the style transfer.

The above describes basic working principles of different implementations where cross-domain image translation is divided into two specific tasks of geometric deformation and style transfer. The image translation solution of the subject matter as described herein may be adapted to perform image translation between two image domains which have different styles and contain objects having geometric deformation with respect to each other; Such image translation is particularly suitable for translation from other image domains to the caricature domain, or from the caricature domain to other image domains, as objects in the caricature domain are usually expressed using exaggerated shapes. In the specific implementations below, for convenience of description, image translation from the photo domain to the caricature domain is used as an example for illustration. However, it should be appreciated that the solution of the subject matter described herein is also adapted for image translation from other image domains to the caricature domain, or from the caricature domain to other image domains.

As used herein, a "caricature" is to be broadly understood as an image with objects presented using exaggerated geometries. Such exaggeration is a deformation (e.g., emphasis/enlargement, reduction, displacement, rotation and warping) relative to geometries of the real-world objects. As used herein, a style of an image refers to appearance features such as color, texture and brightness in the image, including color arrangement, light and dark transition, and texture features. The style of the image does not include the geometries of the objects in the image.

As used herein, a learning network may also be referred to as a "learning model" or a "neural network". The terms "learning model", "learning network", "neural network", "model" and "network" are used interchangeably in the following. In general, a learning network may be understood as being capable of mapping an input to a desired output. This capability of mapping may be derived by training the learning network with training data. The training process of the learning network may be understood as determining network parameters for adjusting the input to obtain the desired mapping output.

Before describing the specific implementations of the subject matter described herein, expected goals in cross-domain image translation related to geometric deformation are first introduced. A reasonable result from caricature generation is that objects presented in the caricature are similar to those created by the artists. An object in the caricature image appear to have exaggerated shapes, but the shape exaggeration is not a distortion. Distortion is completely denial of truth of the object, but the exaggerated shape in the caricature will maintain relative geometric locations of the object (e.g., relative geometric positions of facial features) and only emphasize distinguishing features of a given object from other objects. Therefore, the caricature obtained after the image translation is expected to maintain features of the object in a source image and visually present the style of the caricature.

Furthermore, another expected goal of image translation is to make the generation of the caricatures diversified and controllable. In other words, it is expected that for a given source image, different types of caricatures may be generated, and a final output result may be controlled by the user or in other manners. Furthermore, as mentioned above, it is difficult to obtain paired photos and caricatures to train a learning network in a supervised manner with the cost taken into account. Therefore, to train the learning network, it is expected that the learning network for performing image translation can be trained in an unsupervised manner using unpaired photos and caricatures.

Architecture for Geometry Transformation and Style Transfer in Parallel

Figure 2A:
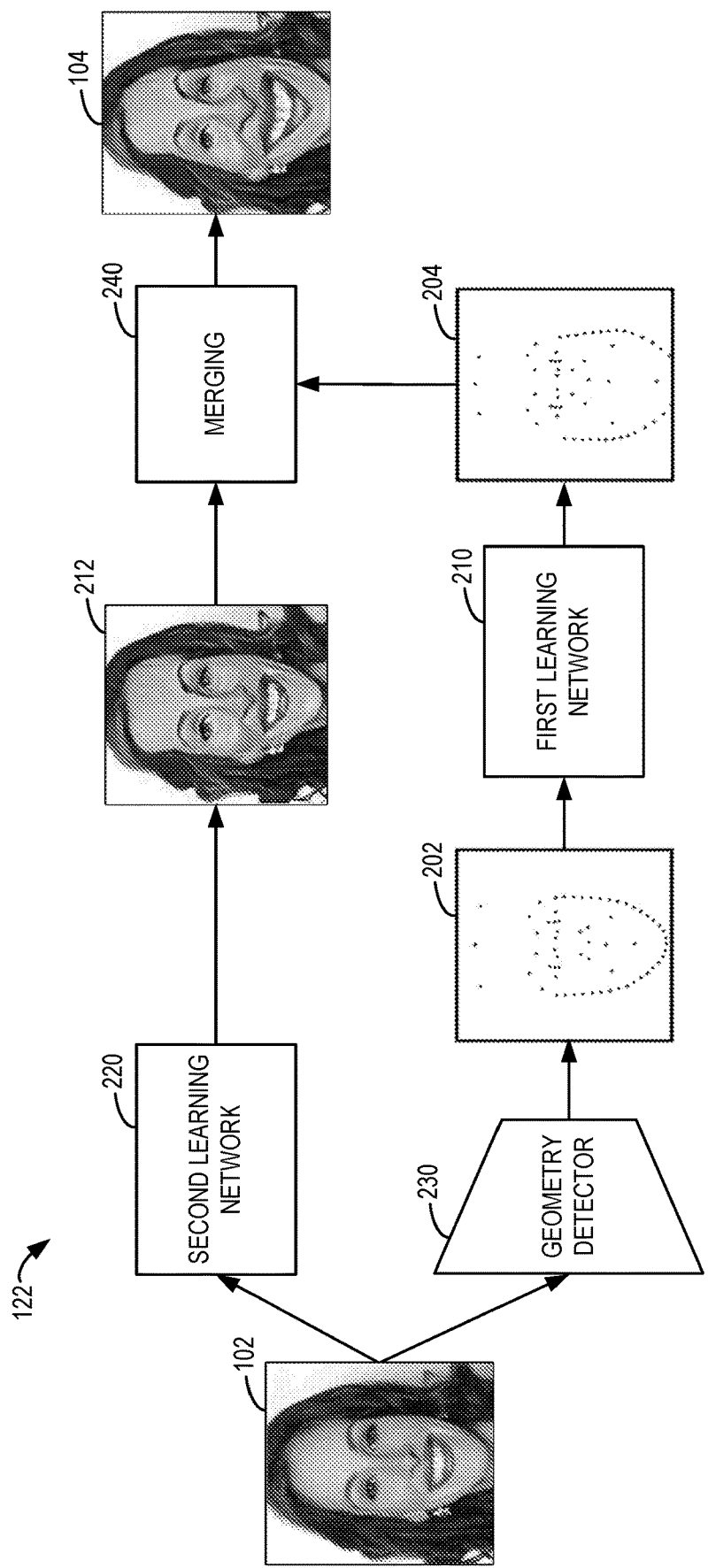
FIG. 2A illustrates a block diagram of an image translation module according to an implementation of the subject matter described herein.

FIG. 2A illustrates architecture of the image translation module according to a first implementation in which geometric deformation and style transfer are performed in parallel. The architecture is implemented based on learning networks and can be implemented at the image translation module 122 of the computing device 100 of FIG. 1. As shown, the image translation module 122 includes a first learning network 210 for geometric deformation and a second learning network 220 for style transfer. The first learning network 210 and the second learning network 220 are capable of operating independently to perform the respective tasks and are independently trained.

It is assumed that X and Y represent a first image domain (taking the photo domain as an example) and a second image domain (taking the caricature domain as an example), respectively. The problem of cross-domain image translation can be described as obtaining a mapping $\Phi: X \rightarrow Y$ that can convert an input of the domain X to a sample in the domain Y, i.e., $y=\Phi(x)$, $y \in Y$. This problem is a typical problem of cross-domain image translation because the photo domain and the caricature domain are different in geometry and style. According to implementations of the subject matter as described herein, this problem is divided into two tasks, i.e., geometric deformation and style transfer. Therefore, the overall map is explicitly decoupled into two maps, a map for geometric deformation $\Phi_{geo}$ and a map for style transfer $\Phi_{app}$. In the example of FIG. 2A, the two maps $\Phi_{geo}$ and $\Phi_{app}$ are learnt by the first learning network 210 and the second learning network 220, respectively. That is, if it is assumed that network parameters of the first learning network 210 and the second learning network 220 have been determined, these networks may be used to process the input source image 102 to obtain the target image 104.

The first learning network 210 is trained to obtain the capability of performing geometric deformation on the input source image 102 to deform a first geometry of an object in the source image 102 into a second geometry in the caricature domain. The source image 102 may be input, for example, by a user, and is an image that the user desires to translate. As compared to real photos, the geometry of the same object in the caricature domain will be deformed to achieve an exaggerated effect. The first learning network 210 only focuses on the geometric deformation of the object, without considering any style transfer of the source image 102.

The image translation module 122 further includes a geometry detector 230 for detecting the geometry of the object in the source image 102 (i.e., the first geometry) for processing by the first learning network 210. The source image 102 may include one or more objects, such as a person, a human face, an animal, a plant, and/or any other object. In the source image 102 as shown in FIG. 2A, the object concerned is a human face. However, the input source image may also include other objects having a particular geometry, and the solution of the subject matter as described herein may also perform geometric deformation on the objects in such source images. The geometry determined by the geometry detector 230 may be represented by lines of objects in the source image 102 (e.g., coordinate points representing respective pixels of the lines, which are coordinate points in a two-dimensional coordinate system of the source image 102).

To reduce the dimensions of the geometry presentation, it is possible to sample the points on the lines representing the first geometry in the source image 102 and use coordinates of the sampled points to represent the geometry. Such sampled points may be landmark points (also referred to as key points) representing the first geometry 202 (shown by points depicting the geometry in the geometry 202 of FIG. 2A), such as facial landmark points. The number and distribution of such landmark points may be configured to retain the shape and relative positions of respective portions of the object. The number of landmark points may be, for example, 16, 32, or 63 points.

The landmark points may also be represented with two-dimensional coordinates, but the data dimensions are still large. Processing such input directly by the first learning network 210 causes the increase of network structure complexity and reduction of the computing efficiency. To further reduce the dimensions, principal component analysis (PCA) may also be performed on the landmark points representing the first geometry 202 to determine a PCA representation of the landmark points (for example, by other modules not shown in FIG. 2A). The first learning network 210 receives the PCA representation representing the first geometry of the object in the source image 102 as an input and performs the geometric deformation on the PCA representation to obtain a deformed PCA representation. The deformed PCA representation is used to determine deformed landmark points having a second geometry 204 (for example, by other modules not shown in FIG. 2A).

PCA is to determining feature vectors in smaller dimensions for a given input to represent the principle features of the input. Such feature vectors are also referred to as principal components. For example, for 63 landmark points of the object in the source image 102, the first 32 principal components may be selected after the principal component analysis. These principal components may be used to recover a majority (about 99.03%) of the input landmark points. Therefore, the 63 landmark points of the object may be represented by a one-dimensional vector composed of 32 PCA coefficients.

In addition to reducing the dimensions, the PCA representation also helps constrain the geometry of the object during processing of the first learning network 210, such as constrain the structure of the face, which can particularly facilitates the learning (training) of the top learning network 210. The PCA representation of the landmark points may be used to reconstruct an embedded space of the geometry of the object, where each principal component represents a direction of variants (e.g., pose, shape, or size). Any sample in this embedded space may maintain the basic structure of the object. This structural constraint is hardly preserved by the landmark points represented by the two-dimensional coordinates since the freedom degree of the positions of the two-dimensional coordinate points is particularly large during the training, which makes it difficult to maintain the geometry of the object.

In some implementations, the first learning network 210 may also perform the geometric deformation based on a degree of deformation indicated by the user to deform the first geometry of the object in the source image 102 to the second geometry. The degree of deformation may be indicated by the user. For example, through a user adjustable parameter may be set to indicate the degree of deformation. The second learning network 210 may determine a deformation of the second geometry relative to the first geometry based on the degree of deformation. For example, if the first learning network 210 is to magnify or diminish a part of the first geometry, the degree of deformation may control the extent to which the part is magnified or diminished.

The second learning network 220 is trained to learn a capability of performing the style transfer on the input source image 102, to transform the source image 102 with a first style in the photo domain to an intermediate image 212 with a second style in the caricature domain. The types of styles in different image domains may differ. For example, caricature styles have hand-drawn strokes in color and texture as compared to real photos. The second learning network 220 only performs the style transfer while retaining the geometry of the object(s) in the source image 102. Thus, the intermediate image 212 is similar to a caricature in style, but is geometrically similar to the source image 102.

During performing the style transfer, the second learning network 220 extracts a content-related feature representation of the source image 102, determines an appearance-related feature representation associated with the second style, and determines the intermediate image 212 based on a content-related feature representation and an appearance-related feature representation. Therefore, the determined intermediate image 212 will simultaneously combine the content of the source image 102 with the second style.

In some implementations, the second learning network 220 may be designed to transfer a given source image to a plurality of different styles in the caricature domain. This capability may be learnt through the training process of the second learning network 220, as will be described in detail below. When the style of the source image 102 is transferred, the appearance-related feature representation, which is associated with the second style and determined by the second learning network 220, may be randomly selected from a plurality of predetermined appearance-related feature representations. The plurality of predetermined appearance-related feature representations are determined from a plurality of images in the caricature domain for training the second learning network 220, which will be described in detail during the training process of the second learning network. The selected appearance-related feature representation associated with the second style may be an appearance-related feature representation that is extracted from an image in the caricature domain, or a combination of a plurality of appearance-related feature representations that are extracted from the plurality of images.

Alternatively, the second style may also be controlled by the user. Specifically, the second style may be indicated by the user (e.g., selected by the user from some styles of the images used to train the learning network 220), or the user provides a reference image with the second style. The second learning network 220 may select an appearance-related feature representation extracted from an image identical or similar to the indicated second style, or extract the appearance-related feature representation from the reference image, to perform the style transfer.

The image translation module 122 further includes a merging module 240 configured to generate a target image 104 based on the second geometry 204 (which is represented by the landmark points) and the intermediate image 212. The merging module 240 performs image warping on the intermediate image 212 under the guidance of the deformed second geometry 204, such that the object in the obtained target image 104 has a same or similar geometry as the second geometry 202 while the style of the target image 104 remains consistent with the intermediate image 212. Therefore, the image translation is achieved from the source image 102 of the photo domain to the target image 104 of the caricature domain.

The first learning network 210 and the second learning network 220 may be selected as a deep learning network structure suitable for image processing. In some implementations, the first learning network 210 and the second learning network 220 may be based on a generative adversarial network (GAN). Such a network is particularly suitable for unsupervised learning based on unpaired images in different image domains. GAN may have a series of variations. The learning goal of the first learning network 210 is that for each input source image, an optimal geometric deformation may be performed to obtain a deformation result corresponding to the source image in the caricature domain, which may be regarded as a one-to-one image translation. A GAN designed to implement such one-to-one image translation may be used to determine the first learning network 210. The learning goal of the second learning network 210 is that for each input image, it is potential to generate intermediate images with different visual styles in the caricature domain, which may be considered a many-to-many image translation. A GAN designed to achieve such many-to-many image translation may be used to determine the second learning network 220.

It should be understood that although the image translation from the photo domain to the caricature domain is described herein as an example herein, the subject matter as described herein may be similarly applicable for image translation from other image domains to an image domain with exaggerated shape deformation as long as images in the corresponding image domains are used to train the learning network. If the translation is to be performed from the image domain with shape exaggeration deformation (such as the caricature domain) to other image domains, the processing flow in FIG. 2A may be implemented reversely. Moreover, it should also be understood that although the term "image" is used herein, the image to be processed may also be a video frame. That is, the solution of the subject matter as described herein may also be applied for translation of respective frames in the video.

The training of the first learning network 210 and the second learning network 220 in the architecture of FIG. 2A will be described below with reference to FIG. 3 and FIG. 4A, respectively.

Architecture for Sequential Geometric Deformation and Style Transfer

Figure 2B:
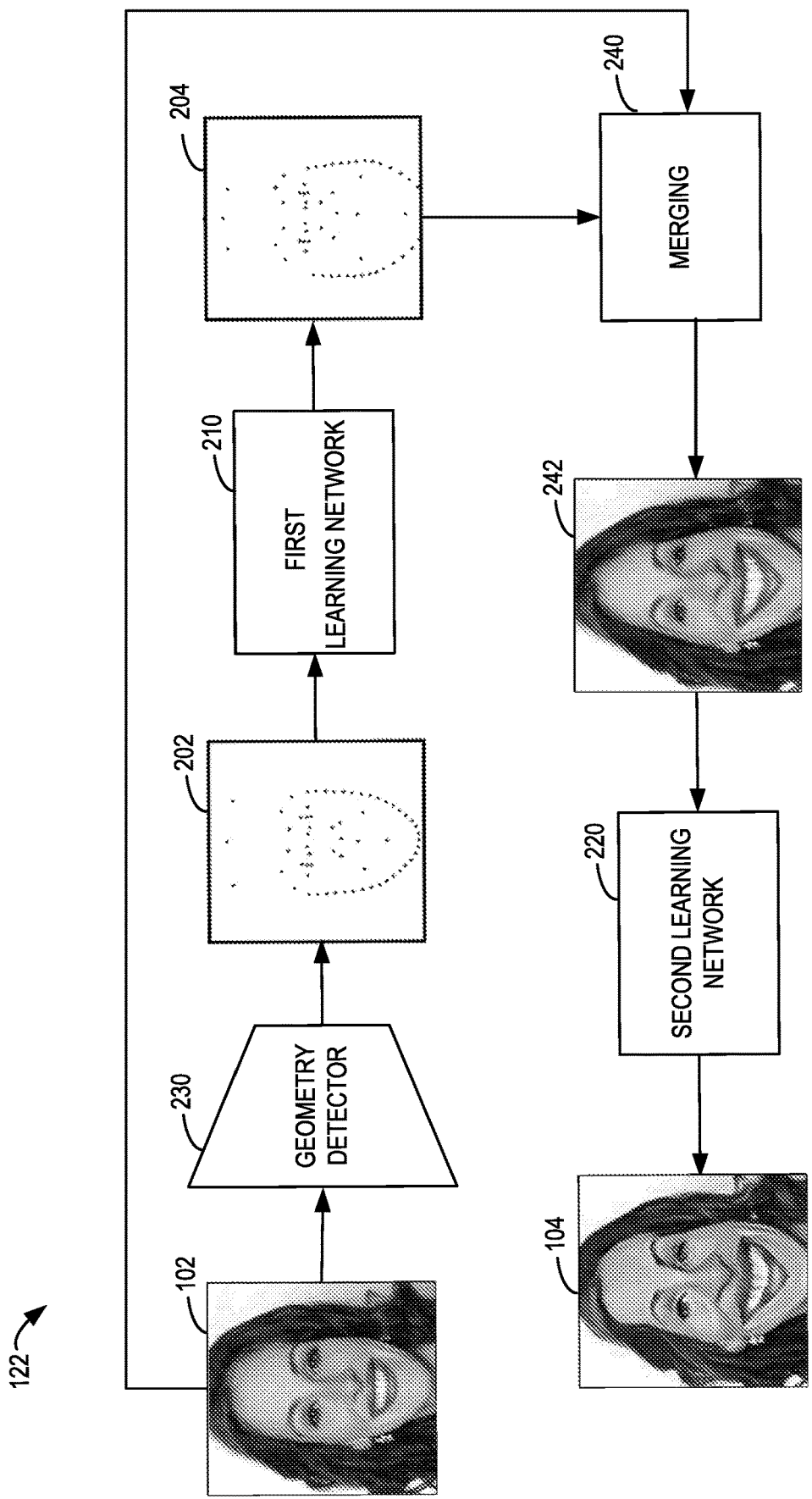
FIG. 2B illustrates a block diagram of an image translation module according to another implementation of the subject matter described herein.

FIG. 2B illustrates architecture of the image translation module 122 according to a second implementation in which geometric deformation and style transfer are performed sequentially. The components in the architecture and the specific functions implemented therein are the same as those in the implementation shown in FIG. 2A. Specifically, the image translation module 122 includes the first learning network 210 for geometric deformation and the second learning network 220 for style transfer, and may further include the geometry detector 230 and the merging module 240.

Different from the implementation of FIG. 2A, after the first learning network 210 performs the geometric deformation on the source image 102 to deform the first geometry 202 of the object in the source image 102 to the second geometry 204, the second geometry 204 and the source image 102 are input together to the merging module 240. The merging module 240 transforms the source image 102 based on the second geometry 204 to generate an intermediate image 242. The merging module 240 performs image warping on the source image 102 under the guidance of the deformed second geometry 204, such that the object in the generated intermediate image 104 has a same or similar geometry as the second geometry 202. Since the warping is performed directly on the source image 102, the intermediate image 242 maintains the same first style of the source image 102 (e.g., the real photo style).

The intermediate image 242 is input to the second learning network 220 to perform the style transfer to generate the target image 104. The specific operation of the style transfer in the second learning network 220 is similar to the implementations as described with reference to FIG. 2A, and details are omitted here. The second learning network 220 may apply a certain style in the caricature domain (which is randomly selected or specified by the user) to the intermediate image 242. Since only the style transfer is performed, the geometry of the object in the target image 104 output by the second learning network 220 remains substantially consistent with the geometry of the intermediate image 242. Therefore, the obtained target image 104 is similar to the caricature in style, and also exhibits geometric exaggeration characteristics in the caricature domain in aspects of geometry.

As mentioned above, the functions of the components in FIG. 2B are similar to those in FIG. 2A. For a learning network, the capability of processing the input is obtained through training. In the implementations of FIG. 2A and FIG. 2B, the first learning network 210 is used to deform a geometry of a real-world object in the photo domain into an exaggerated geometry in the caricature domain. Therefore, the training process of the first learning network 210 is the same, which will be discussed in detail below with reference to FIG. 3. Although operating to perform the style transfer, the types of inputs of the second learning network 220 are different in FIG. 2A and FIG. 2B. In the implementation of FIG. 2A, the capability to be learnt by the second learning network 220 is to process an original image in the photo domain; whereas in the implementation of FIG. 2B, the capability to be learnt by the second learning network 220 is to process an image after the geometric deformation. Accordingly, the training data for training the second learning network 220 in FIG. 2B is different from those for training the second learning network 220 in FIG. 2A. The training of the second learning network 220 used in FIG. 2B will be described below with reference to FIG. 4B.

Training of the Learning Network for Geometric Deformation

It is mentioned above that the first learning network 210 is to obtain the mapping $\Phi_{geo}$ for geometric deformation to map the first geometry of the object in the input source image to the deformed second geometry such that the second geometry includes an exaggerated deformation of a portion with distinctive features in the first geometry. In the implementation using the landmark points to represent the geometry, it is assumed that $L_X$ and $L_Y$ are the domains of landmark points in the photo domain (X) and the caricature domain (Y), respectively. The first learning network 210 is to be trained to learn the mapping $\Phi_{geo}$: $L_X \rightarrow L_Y$ for geometric deformation, such that deformed landmark points $l_y \in L_Y$ in the domain Y are generated for the landmark point $l_x$ of the photo x in the domain X.

The training data for training the first learning network 210 includes first images in the photo domain X (represented as $\{x_i\}_{i=1,\ldots,N}$, $x_i \in X$, N indicating the number of the first images for training) and second images in the caricature domain Y (represented as $\{y_i\}_{i=1,\ldots,M}$, $y_i \in Y$, M representing the number of the second images for training). Although the photos in the photo domain and the caricature domain used in FIG. 3 and subsequent FIGS. 4A and 4B are illustrated as being similar to the photos of the two image domains actually processed and generated by the trained learning network in FIGS. 2A and 2B, this is only for purpose of illustration. In implementations of the subject matter as described herein, the images in the photo domain and caricature domain employed by the training may be any real photos and generated caricatures.

Upon training, although the training images are obtained from the photo domain and the caricature domain, the images in the two image domains used for training may be unpaired, i.e., it is not required that any given first image shall have a second image in the matched domain Y. Photos and caricatures may be arbitrarily selected from an existing database. In some implementations, a first image and a second image herein may have the same type of objects (e.g., human beings, portraits, animals, and so on), but geometric features and style features of the objects are different, especially the degree of geometric deformation of the objects is different. In some implementations, the first image and the second image may be sized to the same size with the same resolution.

In the landmark point-based geometry representation, the landmark points are marked on the first image and the second image both for training. Therefore, the landmark points may be extracted from these images for training. In order to collect the geometry of all possible objects, a similar translation may be utilized to align the first image and the second image for training to an average shape of the objects through several landmark points (e.g., three landmark points on the human face, including centers of both eyes and a center of the mouth).

As mentioned above, the first learning network 210 may be based on a GAN network. The GAN network includes a first sub-network for geometric deformation from the domain X to the domain Y and a second sub-network for geometric deformation from the domain Y to the domain X. The first sub-network corresponds to the first learning network 210. Since the training data is unpaired, the landmark points in $L_X$ and $L_Y$ for the deformation are also unpaired. Thus, the determined mapping $\Phi_{geo}$: $L_X \rightarrow L_Y$ of the first sub-network is under-constrained. Therefore, a reverse mapping $\Phi_{geo}^{-1}$: $L_Y \rightarrow L_X$ of the second sub-network may be used for further constraint. The training process of a network is to determine and optimize network parameters (for example, the parameters of the learning network) which perform the mapping.

Figure 3:
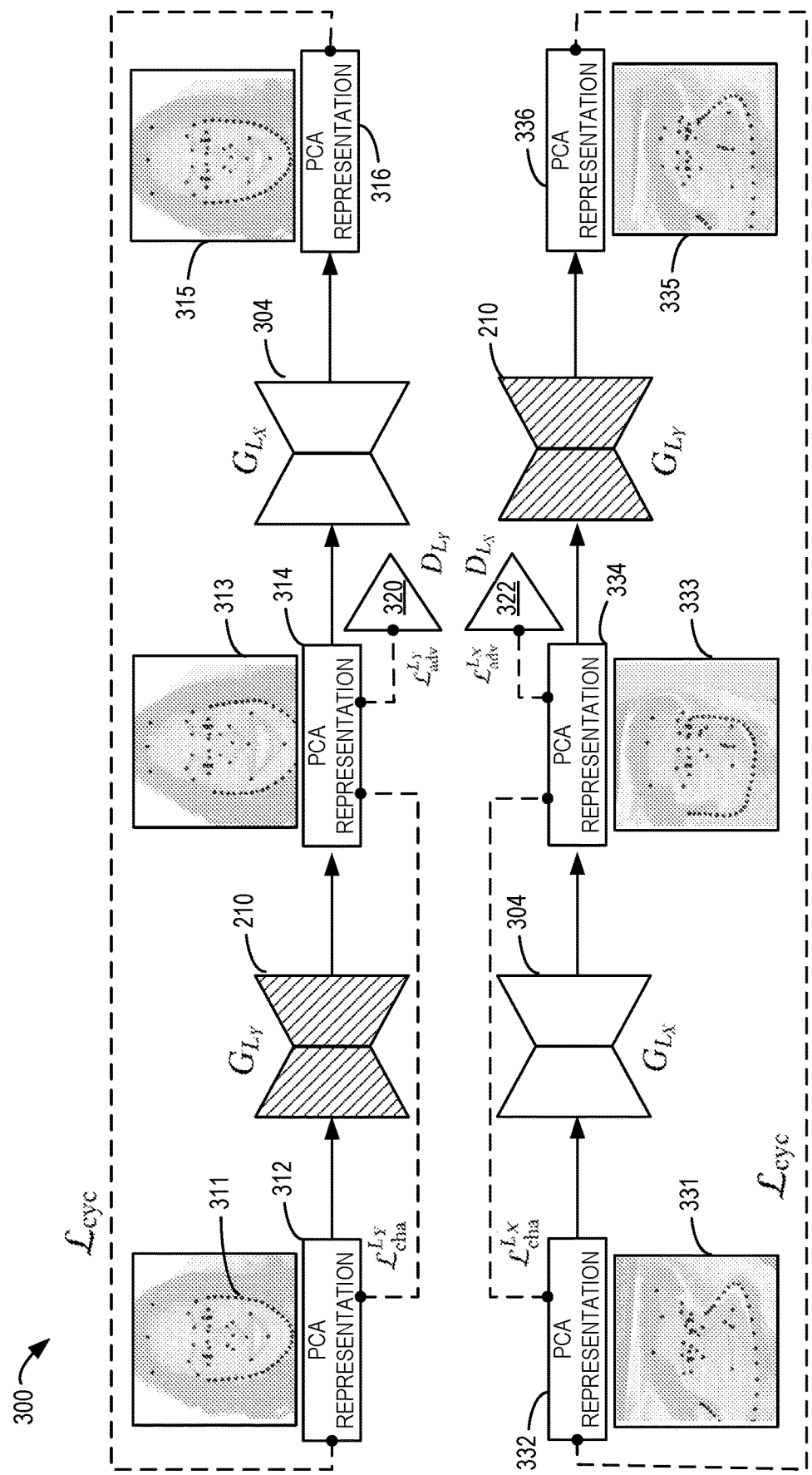
FIG. 3 illustrates a block diagram of a training architecture for training a first learning network according to an implementation of the subject matter described herein.

FIG. 3 illustrates a GAN structure 300 for training the first learning network 210 in the GAN-based implementation.

The GAN structure 330 is a GAN structure based on cycle consistency. The GAN structure 330 includes a plurality of sub-networks, which are two generators 210, 304 and two discriminators 320 and 322 in this example. One of the generators corresponds to the first learning network 210, also referred to as a forward generator 210 (represented as $G_{L_Y}$), which is used for modeling the geometric deformation from the domain X to the domain Y (i.e., the mapping $\Phi_{geo}$). The other generator is a backward generator 304 (represented as $G_{L_X}$) for modeling reverse geometric deformation from the domain Y to the domain X (i.e., the reverse mapping $\Phi_{geo}^{-1}$). Here, the forward generator 210 is sometimes referred to as the first sub-network of the GAN, and the backward generator 304 is sometimes referred to as the second sub-network of the GAN.

The GAN structure 300 includes two paths. The first path is an upper portion of FIG. 3 for training the network based on the first images and the second path is a lower portion of FIG. 3 for training the network based on the second images. In the first path, the forward generator 210 performs the geometric deformation from the domain X to the domain Y (i.e., the mapping $\Phi_{geo}$) on a geometry $l_x$ 311 of the first image in the domain X, to generate a deformed geometry $\hat{l}_y$ 313. The deformed geometry 315 may be represented as $\hat{l}_y = G_{L_Y}(l_x)$. The forward generator 210 may operate on the basis of the PCA representation. For better illustration, image objects corresponding to the geometry before and after the deformation are also shown in FIG. 3.

Specifically, the forward generator 210 takes the PCA representation 312 of the geometry 311 as an input and outputs a PCA representation 314 of the deformed geometry 313 after deformation. The backward generator 304 performs a reverse geometric deformation from the domain Y to the domain X (i.e., the reverse mapping $\Phi_{geo}^{-1}$) on the deformed geometry 313 to obtain a predicted geometry $\hat{l}_x$ 315 in the $L_X$. The input to the backward generator 304 may be the PCA representation 314, and the backward generator 304 outputs a PCA representation 316 of the predicted geometry 315. The discriminator 320 is used for discriminating whether the deformed geometry $\hat{l}_y$ and the ground-truth geometry $l_y$ are distinguishable. The ground-truth geometry $l_y$ is the geometry of an image sampled from the domain Y. In this path, the predicted geometry $\hat{l}_y$ is not only used by the discriminator 320 for determining a result of the forward generator but may also be fed back to the backward generator 304.

The second path in the lower portion of FIG. 3 performs an operation similar to the first path but uses the second image in the domain Y as an input; thus, the order of the generators is adjusted. The backward generator 304 is configured to perform the geometric deformation 331 from the domain Y to the domain X (i.e., the reverse mapping $\Phi_{geo}^{-1}$) for a geometry ly of the second image to generate a deformed geometry $\hat{l}_x$ 333. The backward generator 304 may take a PCA representation 332 of the geometry 331 as an input and output a PCA representation 334 of the deformed geometry 333 after the deformation. The forward generator 210 performs, on the basis of PCA representation, the geometric deformation from the domain X to the domain Y (i.e., the mapping $\Phi_{geo}$) on the deformed geometry 333 to obtain a predicted geometry $\hat{l}_y$ 315 in the $L_X$. The input to the forward generator 210 may be a PCA representation 334, and the forward generator 210 outputs a PCA representation 336 of the predicted geometry 335. The discriminator 322 is used to discriminate whether the deformed geometry $\hat{l}_x$ and the ground-truth geometry lx are distinguishable. The ground-truth geometry lx is the geometry of the image sampled from the domain X In the first and second paths, the parameter values of the forward generator 210 and the inverse generator 304 are shared.

In the GAN structure 300 of FIG. 3, since the forward generator 210 models the geometric deformation from the domain X to the domain Y, it may be considered as the first learning network 210 for geometric deformation.

In some implementations, since the forward generator 210 and the reverse generator 304 perform operations on the basis of the PAC representation, the network structure may be configured to include a fully connected (FC) layer (e.g., formed by processing nodes corresponding to an activation function such as ReLu) without employing a complex convolutional layer. The convolutional layer is generally suitable for pixel-wise image processing and requires more complex calculation. However, due to the low dimensions of the PCA representation, a simple full-connected layer can also achieve the network learning.

The learning process of learning networks is to constantly iteratively update or optimize the network parameters based on an objective function. The objective function may be determined as a loss function or a cost function. In the implementation of the subject matter as disclosed herein, a loss function is taken as an example, but it should be understood that such training may also be performed based on a cost function. In the training of the general GAN network, two types of losses are widely considered, i.e., an adversarial loss (represented as $\mathcal{L}_{adv}^{L_Y}$) and a bidirectional cycle-consistency loss (represented as $\mathcal{L}_{cyc}$).

The adversarial loss encourages the network parameters to be constantly updated such that the resulting deformed geometry is similar to the geometry of the caricature image sampled from the domain Y. For the first path, the adversarial loss may be represented as follows:

$$\mathcal{L}_{adv}^{L_Y}(G_{L_Y}, D_{L_Y}) = \mathbb{E}_{l_y \sim L_Y}[\log D_{L_Y}(l_y)] + \mathbb{E}_{l_x \sim L_X}[\log(1 - D_{L_Y}(G_{L_Y}(l_x)))] \quad (1)$$

Based on the adversarial loss, the forward generator 210 may be updated such that the output predicted geometry cannot be distinguished by the discriminator 320 from the ground-truth geometry. For the second path in the training architecture, the adversarial loss (represented as $\mathcal{L}_{adv}^{L_X}(G_{L_X}, D_{L_X})$) may be similarly determined, for example in the manner listed in Equation (1).

The bidirectional cycle-consistency loss in the GAN network may be used to constrain the cycle consistency between the forward mapping $\Phi_{geo}$ and the reverse mapping $\Phi_{geo}^{-1}$. The principle is that if the forward generator 210 is used as the first learning network 210 to perform geometric deformation on a first image lx, the reverse geometry 304 is able to accurately deform the deformed geometry back to the geometry in the first image lx, i.e., $G_{L_X}(G_{L_Y}(l_x)) \cong l_x$. Similarly, the consistency in the reverse direction may be defined as $G_{L_Y}(G_{L_X}(l_y)) \cong l_y$. Therefore, the bidirectional cycle-consistency loss may be represented as:

$$\mathcal{L}_{cyc}(G_{L_Y}, G_{L_X}) = \mathbb{E}_{l_x \sim L_X}[\|G_{L_X}(G_{L_Y}(l_x)) - l_x\|_1] + \mathbb{E}_{l_y \sim L_Y}[\|G_{L_Y}(G_{L_X}(l_y)) - l_y\|_1] \quad (2)$$

In Equation (2), the cycle-consistency loss in each direction may be represented by an L1 difference between the two vectors. The bidirectional cycle-consistency loss may further constrain the mapping from input to output.

The adversarial loss and bidirectional cycle-consistency loss are two losses that are often considered in the GAN network. However, in the learning task of geometric deformation, training based on the two losses may still be difficult to ensure that the deformed geometry can capture the distinctive noticeable features in the original geometry and exaggerate these features. In some implementations of the subject matter as described herein, a further loss is introduced in the training to maintain the difference between a geometry of an object in an input first image and an average geometry of such type of objects in the photo domain. This is because the difference between the geometry of a certain object and the average geometry of such type of objects represents the distinctive noticeable features of the object and thus should be retained or even emphasized after geometric deformation. For example, if the nose of a certain person's face is bigger than that of an ordinary face, this distinctive noticeable feature should be maintained or even emphasized after the deformation into the caricature domain. Therefore, the newly-introduced loss during training may also be referred to as a characteristic loss (represented as $\mathcal{L}_{cha}^{L_Y}$).

The characteristic loss $\mathcal{L}_{cha}^{L_Y}$ may be considered in both the first path and the second path in the GAN structure 300. In the first path, the characteristic loss $\mathcal{L}_{cha}^{L_Y}$ may be considered by penalizing a difference between a result of the geometry 311 in the input first image subtracting an average geometry in the corresponding image domain and a result of the deformed geometry 313 generated by the forward generator 210 subtracting an average geometry in the corresponding image domain. Specifically, for each input first image for training, after the deformed geometry 313 is generated by the current forward generator 210, a first difference between the geometry 311 (represented as lx) in the first image and the average geometry (represented as $\overline{L_X}$) in the photo domain X is determined, and a second difference between the deformed geometry 313 (represented as $G_{L_Y}(l_x)$) and the average geometry (represented as $\overline{L_Y}$) in the caricature domain Y is also determined. The characteristic loss $\mathcal{L}_{cha}^{L_Y}$ may be determined to minimize a difference between the first and second differences. This may be determined by penalizing the difference between the first and second differences, such as a cosine difference. Here the characteristic loss $\mathcal{L}_{cha}^{L_Y}$ may be represented as follows:

$$\mathcal{L}_{cha}^{L_Y}(G_{L_Y}) = \mathbb{E}_{l_x \sim L_X}[(1 - \cos(l_x - \overline{L_X}, G_{L_Y}(l_x) - \overline{L_Y})] \quad (3)$$

The training target is to minimize $\mathcal{L}_{cha}^{L_Y}$ such that the difference between the geometry of the object in the photo domain and the average geometry and the difference between the geometry of the object in the caricature domain and the average geometry are the same.

Symmetrically, in the second path in the GAN structure 300, the characteristic loss (represented as $$\mathcal{L}_{cha}^{L_X}(G_{L_X}))$$

in the reverse direction may also be determined. Specifically, for each input second image for training, after the deformed geometry 333 is generated by the current reverse generator 305, a third difference between the geometry 331 (represented as ly) in the second image and the average geometry (represented as $\overline{L_Y}$) in the caricature domain Y is determined, and a fourth difference between the deformed geometry 333 (represented as $G_{LY}(ly)$) and the average geometry (represented as $\overline{L_X}$) in the photo domain is further determined. The reverse characteristic loss $$\mathcal{L}_{cha}^{L_X^-}(G_{L_X})$$

may be determined to minimize the difference between the third difference and the fourth difference. This may be determined by penalizing the difference between the third and fourth differences, such as a cosine difference. The reverse characteristic loss $$\mathcal{L}_{cha}^{L_X^-}(G_{L_X})$$

may be defined similar to Equation (3).

After considering the various losses mentioned above, the objective function for training the GAN structure 300 may be determined to optimize the following loss function:

$$\mathcal{L}_{geo} = \mathcal{L}_{adv}^{L_X} + \mathcal{L}_{adv}^{L_Y} + \lambda_{cyc}\mathcal{L}_{cyc} + \lambda_{cha}(\mathcal{L}_{cha}^{L_X} + \mathcal{L}_{cha}^{L_Y}) \quad (4)$$

This loss function takes into account different types of losses in the first path and the second path, including the characteristic loss for maintaining the noticeable features of the geometry of the object. In Equation (4), the parameters $\lambda_{cyc}$ and $\lambda_{cha}$ are predetermined values for balancing different types of losses.

During the training process, the GAN structure 300 may be trained using a plurality of first and second images in the photo domain and the caricature domain, where each of the first and second images can facilitate in updating the parameter values of the forward generator 210 and the reverse generator 304 after passing through the GAN structure 300. In the GAN structure 300, the forward generator 210 and the reverse generator 304 are jointly trained. A variety of training techniques for machine learning may be used to train the GAN structure, such as the stochastic gradient descent algorithm, forward propagation, backward propagation, and the like. After the convergence of the overall loss function (e.g., Equation (4)) is reached, the trained forward generator 210 and the reverse generator 304 are obtained.

After the training is completed, the set of parameters of the forward generator 210 and the backward generator 304 can be determined. The forward generator 210 may be determined as the first learning network 210, which is capable of performing geometric deformation from the photo domain X to the caricature domain Y. Other portions of the GAN structure 300 may be considered as being configured for training the first learning network 210 and are not used in the application phase of the network.

It should be understood that although a first image for training in FIG. 3 is shown as having a photo similar to the one used in the application phase in FIGS. 2A and 2B, during the training phase, any existing available photos in the photo domain can be retrieved to perform the training. The first images for training purposes are only required to include a specific type of objects of interest.

First Example Training of the Learning Network for Style Transfer

The above mentions that the second learning network 220 is to obtain the mapping $\Phi_{app}$ for style transfer to transfer an image with a first style into an image with a second style in the caricature domain. During training of the second learning network 220, if first images ($\{x_i\}_{i=1, \ldots, N}$, $x_i \in X$) in the photo domain X and second images ($\{y_i\}_{i=1, \ldots, M}$, $y_i \in Y$) in the caricature domain Y are directly used as training images, due to the larger geometric differences between objects in these images, the geometries and styles of the objects in the image output by the second learning network 220 may be confused with each other.

In order to avoid the impact of geometric differences in the training images, it is proposed to construct an intermediate domain in the implementation of the subject matter as described herein. When the second learning network 220 used in the architecture of FIG. 2A is trained, the second image in the caricature domain Y for training is transformed into an intermediate image (represented as $\{y'_i\}_{i=1, \ldots, M}$, $y'_i \in Y'$) of the intermediate domain (represented as Y') by geometric deformation. The intermediate domain Y' is between the photo domain X and the caricature domain Y, and the intermediate image inherits a same style as the second image in the caricature domain Y but has a geometry similar to the object in the photo domain X The intermediate image in the intermediate domain Y' may be generated by performing geometric deformation from the caricature domain Y to the photo domain X on the second image. In some implementations, such mapping from the domain Y to the domain X may be learnt by the backward generator 304 when the first learning network 210 is trained. Therefore, in some implementations, the GAN structure 300 may be trained first. When the first learning network 210 is trained, the backward generator 304 is also trained to translate the second image in the caricature domain Y to the intermediate image of the intermediate domain of Y', i.e., $G_{L_X}(y_i)$.

The second learning network 220 may be determined based on the first image in the photo domain X and the intermediate image of the intermediate domain Y' to obtain a capability of transferring the style from the photo domain X to the caricature domain Y. The second learning network 220 may obtain a mapping from domain X to domain Y', which is a pure-style image translation without considering geometric deformation. Therefore, the second learning network 220 may utilize any learning network suitable for style transfer. In fact, from the perspective of stylization, the style transfer from the domain X to the domain Y' is equivalent to the style transfer from the domain X to the domain Y because the style in the domain Y' is consistent with the style in the domain Y.

In some implementations, similar to the first learning network 210, the second learning network 220 may also be based on the GAN network. In some examples, the second learning network 220 may be based on a GAN network with cycle consistency, such as a GAN similar to the first learning network 210 (as in FIG. 3). Such GAN network may only generate a one-to-one output. In other implementations, the second learning network 220 may be based on a GAN network that implements a many-to-many mapping and is capable of performing unsupervised learning. Currently, some learning networks that implement the many-to-many mapping mainly consider the cycle consistency at the feature level, which makes it difficult to maintain the geometry of objects in an image. Therefore, in some implementations of training the second learning network 220, the training of the second learning network 220 is constrained using image-level cycle consistency.

Figure 4A:
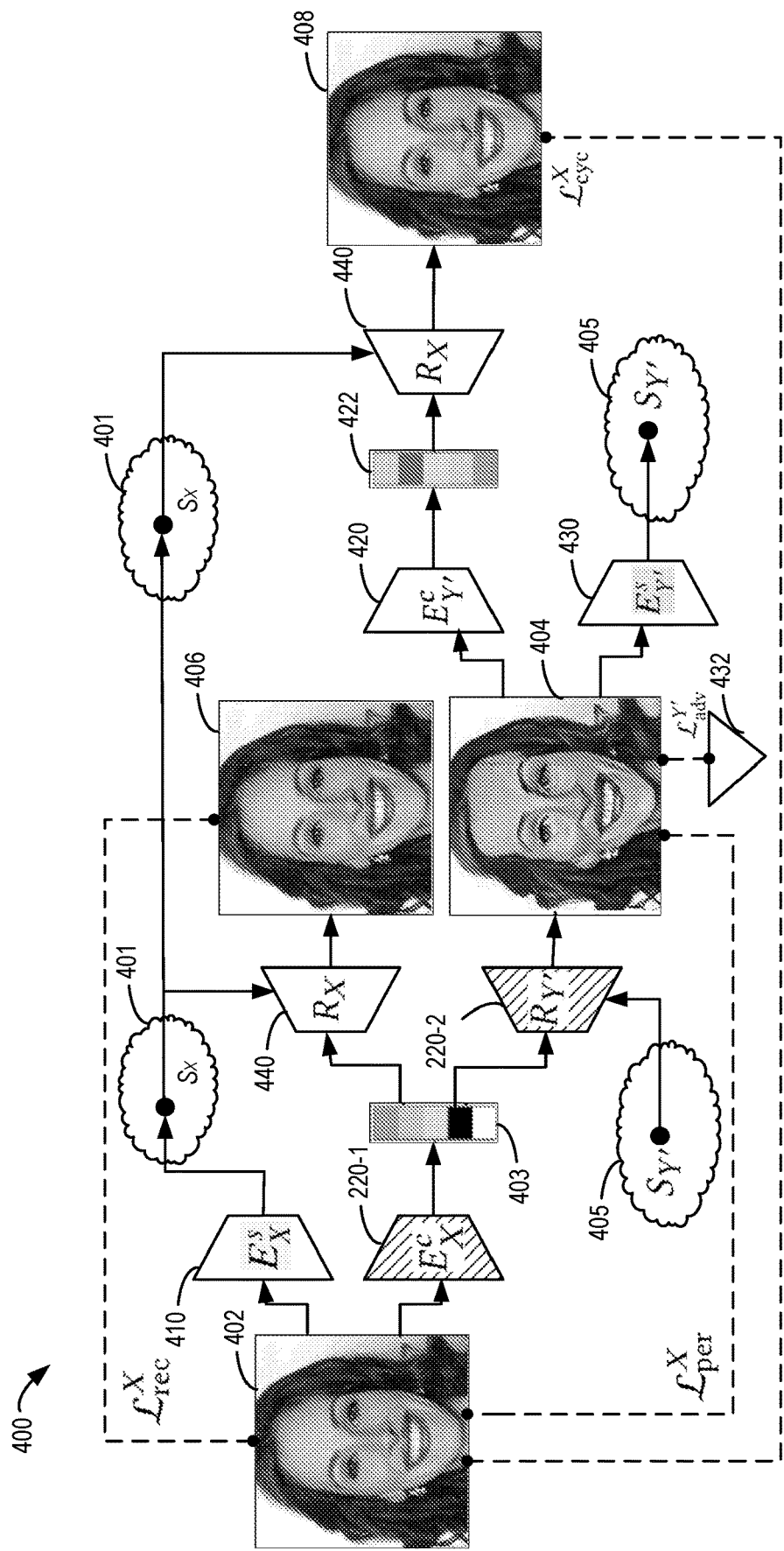
FIG. 4A illustrates a block diagram of a training architecture for training a second learning network according to an implementation of the subject matter described herein.
Figure 4B:
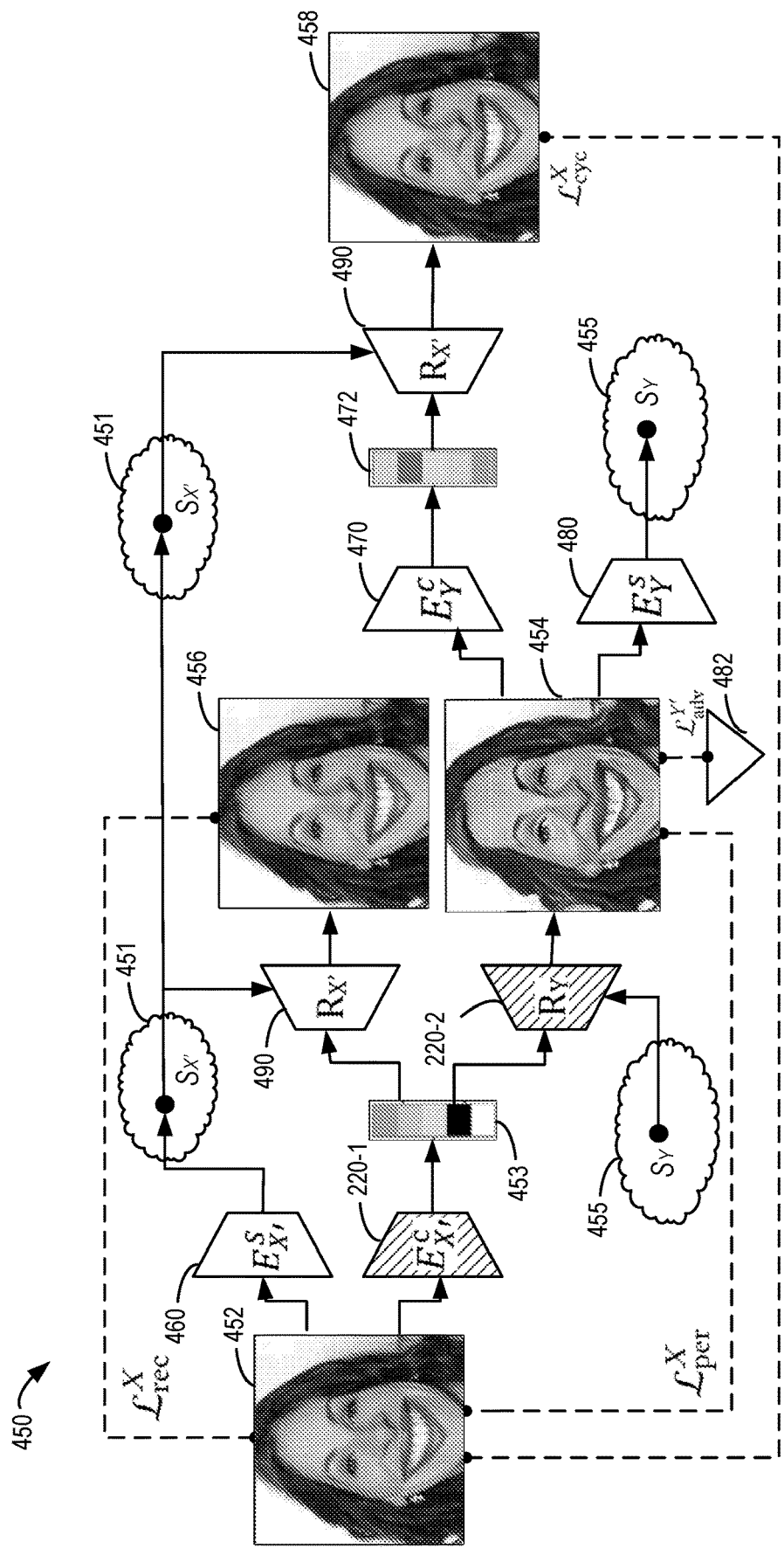
FIG. 4B illustrates a block diagram of a training architecture for training a second learning network according to another implementation of the subject matter described herein.

FIG. 4A illustrates a GAN structure 400 for training the second learning network 220 in a GAN-based implementation. The training of the second learning network 220 may be based on a cycle-consistency GAN structure consisting of opposite bidirectional paths, similar to FIG. 3. However, for convenience of illustration, only the first path from the domain X to the domain Y' is shown in FIG. 4A. The second path in the other direction may be constructed symmetrically for training, similar to the second path in FIG. 3. The processing and training of the first path in the direction from the domain X to the domain Y' will first be described below.

In the GAN structure 400, the generator of the GAN is further subdivided into an encoder portion and a decoder portion. For the input image, two encoders are used to model the content and style of the image, respectively, and extract the content-related feature representation and the appearance-related feature representation of the input image. Such separation of content and style enables application of different styles to the same content, thereby obtaining different outputs. Decoders are used to perform the reverse operations of the encoders. In such structure, the second learning network 220 for style transfer consists of the encoders in the domain X and the decoders decoding to the domain Y'.

As shown, the GAN structure 400 includes a forward generator portion consisting of a content encoder 410 (represented as $E_X^s$) for the domain X, a style encoder 220-1 (represented as $E_X^c$) and a decoder 220-2 for the domain Y'. The style encoder 220-1 and the decoder 220-2 form a second learning sub-network 220. The GAN network 400 further includes a backward generator portion consisting of a content encoder 420 (represented as $E_{Y'}^c$) for the domain Y', a style encoder 430 (represented as $E_{Y'}^s$), and a decoder 440 ($R_X$) for the domain X.

For each domain I (I=X or Y'), the content-related feature representation ($c_I$, also referred to as a content code, e.g., a content code 403 of the domain X and a content code 422 of domain Y' shown in FIG. 4A) is extracted by the content encoder $E_I^c$ (e.g., the content encoder 410 of the domain X in the first path) from the input image (represented as $z_I \in I$, the image 402 in the domain X shown in FIG. 4A). Content-related feature representations extracted from a plurality of input images may form a content library, represented as $C_I$. For each domain I (I=X or Y'), the style encoder $E_I^s$ also extracts an appearance-related feature representation ($S_I$, also referred to as a style code) from an input image (represented as $z_I \in I$, e.g., the first image in the domain X as shown in FIG. 4A or the intermediate image in the domain Y' which is not shown). Each appearance-related feature may characterize the style in which the corresponding image presents in appearance. Appearance-related feature representations extracted from a plurality of input images form a style library (e.g., a style library $S_X$ 401 for the domain X and a style library $S_{Y'}$ 405 for the domain Y'). Each content-related feature representation and each appearance-related feature representation may be represented as $(c_I, s_I)=(E_I^c(z_I), E_I^s(z_I))$. For each domain I (I=X or Y'), the decoder $R_I$ reconstructs the image based on the content-related feature representation and the appearance-related feature representation, $z_I=R_I(c_I, s_I)$. It is assumed that the content library Ci and the style library Si obtained from the plurality of first images and intermediate images for training satisfy a Gaussian distribution N(0, 1).

In the first path of the direction from the domain X to the domain Y' shown in FIG. 4A, for the first image x∈X in the given domain X, the content encoder 220-1 extracts the content-related feature representation 403 $c_x = E_X^c(x)$, and randomly selects, from the style library $S_{Y'}$ 405, an appearance-related feature representation $s_{y'}$ associated with a certain style. The decoder 220-2 is then used to generate an output image y' with a style in the caricature domain, which is represented as $y'=R_{Y'}(c_x, s_{y'})$. The content encoder 420, the style encoder 430, and the decoder 440 also operate similarly.

To train such a GAN structure 400, a corresponding objective function, such as a loss function, may be determined. In the implementations of the subject matter as described herein, typical losses in normal training of the GAN network can be considered, such as the adversarial loss and the cycle-consistency loss described with reference to FIG. 3.

In the GAN structure 400, the adversarial loss is used to constrain the result $R_{Y'}(E_X^c(x), s_{y'})$ generated by the decoder 220-2 to be the same as the ground-truth intermediate image selected from the intermediate domain Y'. The GAN structure 400 may also include a discriminator 432 to discriminate whether $R_{Y'}(E_X^c(x), s_{y'})$ is the same as the ground-truth intermediate image. In the second path of the opposite direction not shown in FIG. 4A, a symmetric adversarial loss $\mathcal{L}_{adv}^X(E_{Y'}, R_X, D_X)$ may also be obtained, where $D_X$ represents a discriminator for the domain X.

In some implementations, another type of loss for training may be a reconstruction loss for penalizing a difference between the input image 402 and a predicted image 406 determined based on the content-related feature representation and the appearance-related feature representation extracted from the input image, such that the input image is as similar as possible to the reconstructed image. The input image and the reconstructed image may differ depending on the directions. For example, in the first path of a direction from the domain X to the domain Y' as shown in FIG. 4A, the input image is the image 402 which is in the domain X and has a photo style, the predicted image 406 is reconstructed by the decoder 440 of the domain X according to the content-related feature representation 403 of the input image 402 and the appearance-related feature representation randomly selected from the style library $S_X$ 401 for the domain X In the symmetric second path of a direction from the domain Y' to the domain X, the input image is an image which is in the domain Y' and has a caricature style. The reconstructed image is also an image reconstructed by a similar decoder according to the content-related feature representation of the input image and the appearance-related feature representation randomly selected from the style library of the domain Y'. The reconstruction loss may be represented as:

$$\mathcal{L}_{rec}^I(E_I^c, E_I^s, R_I) = \mathbb{E}_{z \sim I}[\|R_I(E_I^c(z), E_I^s(z)) - z\|_1] \quad (5)$$

where I=X or Y'. In the case of I=X, Equation (5) represents the reconstruction loss in the first path of the direction from the domain X to the domain Y', and In the case of I=Y', Equation (5) represents the reconstruction loss in the first path of the direction from the domain Y' to the domain X.

Another type of loss can be a cycle-consistency loss for constraining that the input image can be converted back to the original one after passing through the forward mapping in the forward generator portion and the reverse mapping in the reverse generator portion. Specifically, in the GAN structure 400 as illustrated in FIG. 4A, for a given input image 402 x∈X, the mapping from the domain X to the domain Y' is performed by the content encoder 220-1 and the decoder 220-2 in a forward mapping, to obtain a predicted image 404 (represented as $R_{Y'}(E_X^c(x), s_{y'})$, $s_{y'} \in S_{Y'}$, sometimes also referred to as a first predicted image herein). As mentioned above, the decoder 220-2 randomly selects a style in the domain Y' (equivalent to the style in the caricature domain Y) to perform the transfer, so that the first predicted image 404 $R_{Y'}(E_X^c(x), s_{y'})$, $s_{y'} \in S_{Y'}$, has a style in the caricature domain, but the geometry in the object still remains substantially the same as the image 402. Therefore, the first predicted image 404 is in fact a prediction of the intermediate image in the intermediate domain Y'.

The result of decoder 220-2 is fed back to the content encoder 420 of the domain Y' to extract an appearance-related feature representation 422 of the predicted intermediate image. The decoder 440 randomly selects an appearance-related feature representation from the style library Sx 401 for the domain X, and obtains a predicted image 408 (represented as $R_X(E_{Y'}^c(R_{Y'}(E_X^c(x), s_{y'})), s_x)$) based on the content-related feature representation 422 of the input image 402 and the selected appearance-related feature representation. Since both content and style are from the domain X, the predicted image 408 is in fact a prediction of the input image 402.

The cycle-consistency loss in the direction from the domain X to the domain Y' is used to constrain the predicted image 408 to constantly get similar to the input first image 402, which may be represented as:

$$\mathcal{L}_{cyc}^X(E_X^c, R_{Y'}, E_{Y'}^c, R_X) = \mathbb{E}_{x \sim X, s_x \sim S_X, s_{y'} \sim S_{Y'}}[\|R_X(E_{Y'}^c (R_{Y'}(E_X^c(x), s_{y'})), s_x) - x\|_2] \quad (6)$$

Equation (6) shows that a difference between two images is indicated by an L2 difference. Unlike the cycle-consistency loss used in a conventional GAN network for many-to-many mapping, in the implementation of the subject matter as described herein, the cycle-consistency loss is based on an image-level difference, i.e., the difference between the predicted image and the ground-truth input image. The goal of training is to make such differences as low as possible. In the example of Equation (6), this difference is represented by the L2 difference between the two images. Of course, other methods for determining image differences may also be employed.

In some implementations, the cycle-consistency loss on the second path in the direction from the domain Y' to the domain X may also be similarly calculated, represented as $\mathcal{L}_{cyc}^{Y'}(E_{Y'}^c, R_X, E_X^c, R_{Y'})$. The determination of the cycle-consistency loss may be similar to Equation (6), but directions of respective transformations are opposite (i.e., the transformation from the domain X to the domain Y' involved in Equation (6) is reversed to the transformation from the domain Y' to the domain X).

The type of loss mentioned above is a loss usually considered from a GAN network with cycle consistency and many-to-many mapping. However, training the GAN structure 400 with these losses only may not be able to train the GAN structure 400 to completely separate content features from geometric features of the image, which may make it difficult to maintain the geometry of the object after the image translation. In some implementations of the subject matter as described herein, additional losses are also considered to further optimize the training of the GAN structure 400. Such loss is referred to as a perceptual loss which is used for explicitly constraining the input image of the constraint encoder and the output image of the decoder to remain unchanged in content.

Specifically, in the GAN structure 400 shown in FIG. 4A, for the first image 402 input for training, the sub-networks composed of the content encoder 220-1 and the decoder 220-2 are used to implement the style transfer of the first image 402, thereby obtaining a first predicted image 404 (represented as $R_{Y'}(E_X^c(x), s_{y'})$, where the style of the first predicted image 404 is randomly selected from the style library 405 of the domain Y'. The perceptual loss refers to a difference in content between the first predicted image 404 and the first image 402. Such difference may be represented based on a difference between respective feature maps extracted from the first predicted image 404 and the first image 402, particularly a difference between content-related feature maps. The perceptual loss may be represented as:

$$\mathcal{L}_{per}^X(E_X^c, R_{Y'}) = \mathbb{E}_{x \sim X, s_{y'} \sim Y'}[\|VGG19_{5\_3}(R_{Y'}(E_X^c(x), s_{y'})) - VGG19_{5\_3}(x)\|_2], \quad (7)$$

where $VGG19_{5\_3}$ (a) represents a content-related feature map extracted from the image a. Equation (7) indicates the difference between the feature maps and the L2 difference representation. The perceptual loss $\mathcal{L}_{per}^X(E_X^c, R_{Y'})$ is mainly used to constrain the training of the content encoder 220-1 and decoder 220-2.

In the second path of the direction from the domain Y' to the domain X not shown in FIG. 4A, the perceptual loss (represented as $\mathcal{L}_{per}^{Y'}(E_{Y'}^c, R_X)$) may also be similarly determined. In this opposite second path, the input image is an intermediate image translated from the second image in the domain Y. The second image may be any known caricature, and may or may not include a caricature that matches the first image 402. The style transfer from the domain Y' to the domain X is performed by the content encoder 420 and another decoder (not involved in FIG. 4A). The intermediate image may have any style in the domain Y' (equivalent to any style in the domain Y) (assuming that the intermediate image has a third style in the domain Y as the second image), and the style to be transferred may be a style (referred to as a fourth style) randomly selected from the style library 401 of the domain X The perceived loss $\mathcal{L}_{per}^{Y'}(E_{Y'}^c, R_X)$ may be represented based on the difference between the input intermediate image and the second predicted image for the image 402. The perceptual losses $\mathcal{L}_{per}^X(E_X^c, R_{Y'})$ and $\mathcal{L}_{per}^{Y'}(E_{Y'}^c, R_X)$ in both directions may be used to jointly train the content encoder 220-1 and decoder 220-2, as well as the content encoder 420 and another decoder.

By considering the various losses mentioned above, the objective function for training the GAN structure 400 shown in FIG. 4A and its symmetric GAN structure may be determined to optimize the following loss function:

$$\mathcal{L}_{app} = \mathcal{L}_{adv}^X + \mathcal{L}_{adv}^{Y'} + \lambda_{rec}(\mathcal{L}_{rec}^X + \mathcal{L}_{rec}^{Y'}) + \lambda_{cyc}(\mathcal{L}_{cyc}^X + \mathcal{L}_{cyc}^{Y'}) + \lambda_{per}(\mathcal{L}_{per}^X + \mathcal{L}_{per}^{Y'}) \quad (8)$$

where the parameters $\lambda_{rec}$, $\lambda_{cyc}$ and $\lambda_{per}$ are predetermined values to balance different types of losses.

During the training process, the GAN structure 400 and its symmetrical structure may be iteratively trained using a plurality of images in the photo domain and the intermediate domain, to constantly update parameter values of portions therein. During the training process, various training techniques for machine learning may be employed to train the GAN structure, such as the stochastic gradient descent, forward propagation, backward propagation, and the like. After the convergence of the overall loss function (e.g., Equation (8)) is reached, the trained content encoder 220-1 and decoder 220-2 are obtained and determined to be the second learning network 220 for performing style transfer for a given first image in the domain X Other portions of the GAN structure are configured only for the purpose of training the second learning network 220 and are not used in the application phase of the network.

As can be seen from the structure of FIG. 4A, the decoder 220-2 in the second learning network 220 may select an appearance-related feature representation associated with a different style to perform the transfer for the same content-related feature representation of the input image, thereby obtaining the output with a different style. This property of the decoder 220-2 enables a flexible style output. As mentioned above, during the application, in addition to selecting a style for transfer from the style library obtained based on the training images randomly or through an indication from the user, it is also possible that the user inputs a reference image with a certain style. The appearance-related feature representation of the reference image may be extracted by an additional sub-network, and then the extracted appearance-related feature representation is provided to the decoder 220-2 to perform the style transfer.

Second Example Training of a Learning Network for Style Transfer

FIG. 4A describes how to train the second learning network 220 used in FIG. 2A above, and the second learning network 220 obtained through such training may learn how to perform the style transfer on the original photo to generate a photo with a caricature style. In some other implementations of the subject matter as described herein, such as in the implementation of FIG. 2B, it is desirable that the second learning network 220 can learn how to perform style transfer for the deformed original photo to generate a caricature with a caricature style.

The second learning network 220 is still based on a GAN network that implements a many-to-many mapping and is capable of performing unsupervised learning. Considering the training data, in order to avoid the influence of geometric differences in the training images, a first image in the photo domain X for training is transformed into an intermediate image of the intermediate domain (represented as X') by the geometric deformation. The intermediate domain X' is between the photo domain X and the caricature domain Y, the intermediate image inherits a same style as the first image in the photo domain X but has a geometry similar to that of the object in the caricature domain Y. The intermediate image in the intermediate domain X' may be generated by performing geometric deformation from the photo domain X to the caricature domain Y on the first image. In some implementations, such mapping from the domain Y to the domain X may be performed by the trained first learning network 210.

The second learning network 220 is trained based on the intermediate image in the intermediate domain X' and the second image in the caricature domain Y, such that the second learning network 220 may be able to learn a capability of performing style transfer from the intermediate domain X' to the caricature domain Y. Since the style in the intermediate domain X' is the same as the photo domain X, this is equivalent to the second learning network 220 implementing the style transfer from the photo domain X to the caricature domain Y.

FIG. 4B illustrates a GAN structure 450 for training the second learning network 220 in a GAN-based implementation. The training of the second learning network 220 may be based on a cycle-consistency GAN structure consisting of opposite bidirectional paths, similar to FIGS. 3 and 4A. For convenience of illustration, only the first path in a direction from the domain X' to the domain Y is shown in FIG. 4B. The second path in the other direction may be constructed symmetrically for training, similar to the second path in FIG. 3.

During the specific training, components involved in the GAN architecture 460 and their configuration are similar to the GAN architecture 400 of FIG. 4A. However, the inputs for training the components are different. As shown, the GAN structure 450 includes a forward generator portion consisting of a content encoder 460 (represented as $E_{X'}^S$) for the domain X', a style encoder 220-1 (represented as $E_{X'}^S$) and a decoder 220-2 (represented as $R_Y$) for the domain Y'. The style encoder 220-1 and the decoder 220-2 form a second learning sub-network 220. The GAN network 450 further includes a backward generator portion consisting of a content encoder 470 (represented as $E_Y^c$) for the domain Y, a style encoder 480 (represented as $E_Y^c$), and a decoder 490 ($R_{X'}$) for the domain X'. The GAN network 450 may further include a discriminator 482. These components operate in a similar manner to the components similarly arranged in FIG. 4A.

During the specific training, components involved in the GAN architecture 450 and their configuration are similar to the GAN architecture 400 of FIG. 4A. However, the inputs to the components are different. For example, in the first path shown in FIG. 4B, the content encoder 220-1 extracts a content-related feature representation 453 (also referred to as a content code of the domain X') from the intermediate image 452 in the input intermediate domain X'. The content codes extracted by a plurality of intermediate images form a content library. A style encoder 460 extracts an appearance-related feature representation (also referred to as a style code) from the intermediate image 452. The appearance-related feature representations extracted from a plurality of intermediate images form a style library (e.g., style library $S_{X'}$ 451 for domain X'). A decoder 490 performs image reconstruction based on the content-related feature representation 453 and the appearance-related feature representation selected from the style library $S_{X'}$ 451 to obtain a predicted image 456. The decoder 220-2 performs image reconstruction based on the content-related feature representation 453 and the appearance-related feature representation selected from the style library $S_Y$ 455 for the domain Y to obtain a reconstructed image 454 (sometimes also referred to as a first predicted image).

The content encoder 470 extracts the content-related feature representation 472 from the reconstructed image 454, and the decoder 490 performs image reconstruction based on the content-related feature representation 472 and an appearance-related feature representation selected from the style library $S_{X'}$ 451 to obtain a predicted image 458. The style encoder 480 is used to extract the appearance related feature representation (also referred to as a style code) from the reconstructed image 454. The style codes extracted from a plurality of such reconstructed images may form a style library (i.e., the style library $S_Y$ 455 for the domain Y).

Although these components are trained with different training images, the training algorithms used for training, such as the types of the loss functions, may be similar to those used in FIG. 4A. The loss functions considered in training include a reconstruction loss, such as the one in the above Equation (5), where I=X' or Y. The loss function considered during training may also include a cycle-consistency loss from the domain Y to the domain X' in Equation (6) or a cycle-consistency loss from the domain X' to the domain Y in a reverse direction.

In addition, the loss function may further include a perceptual loss. In the architecture of FIG. 4B, the perceptual loss in the first path refers to a difference in content between a first predicted image 454 after the style transfer with the encoder 220-1 and the decoder 220-2 and the input intermediate image 452. Such a difference may be represented based on a difference between feature maps extracted from the first predicted image 404 and the first image 402 respectively, particularly a difference between content-related feature maps, as described in Equation (7). The training process will make the perceptual difference reduce constantly. When the perceptual loss is considered in the opposite second path, the perceptual loss refers to reduction of the difference in content between a predicted image (hereinafter referred to as a second predicted image) after the style transfer for the second image of the domain Y with the encoder 220-1 and decoder 220-2 and the second image. The determination of the perceptual loss is also similar to the perceptual loss considered in the architecture of FIG. 4A and will not be described in detail here.

As can be seen from the structure of FIG. 4B, the decoder 220-2 forming the second learning network 220 may select an appearance-related feature representation associated with a different style to perform transfer for the same content-related feature representation of the intermediate image, thereby obtaining an output with a different style. This property of the decoder 220-2 enables a flexible style output. As mentioned above, during the application, in addition to selecting a style for transfer from the style library obtained based on the training images randomly or through an indication from the user, it is also possible that the user inputs a reference image with a certain style. The appearance-related feature representation of the reference image may be extracted by an additional sub-network, and then the extracted appearance-related feature representation is provided to the decoder 220-2 to perform the style transfer.

Example Process

Figure 5A:
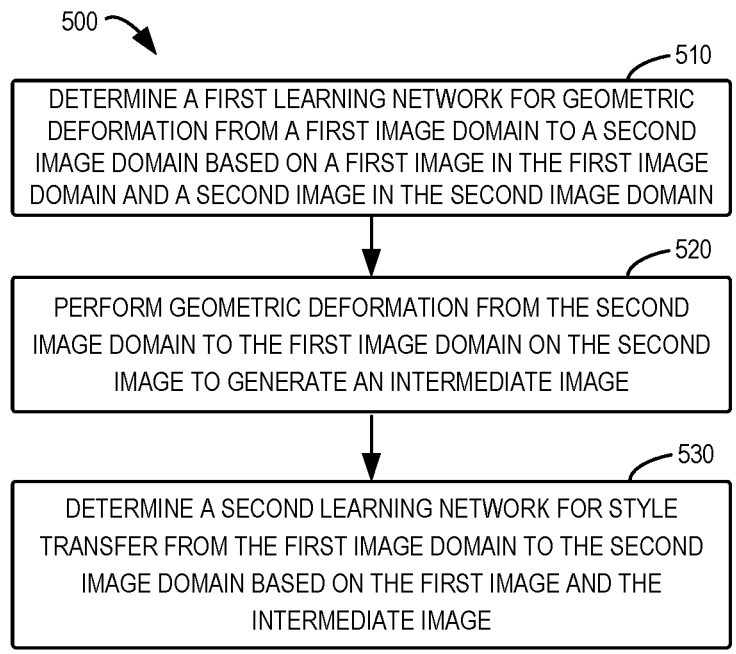
FIG. 5A illustrates a flowchart of a process for cross-domain image translation according to an implementation of the subject matter described herein.

FIG. 5A illustrates a flowchart of a process 500 of training a learning network according to some implementations of the subject matter as described herein. The process 500 may be implemented by the computing device 100 or other devices or device clusters similar to the computing device 100.

At block 510, a first learning network for geometric deformation from a first image domain to a second image domain is determined based on a first image in the first image domain and a second image in the second image domain. Images in the first and second image domains have different styles and objects in the images have geometric deformation with respect to each other. At block 520, geometric deformation from the second image domain to the first image domain is performed on the second image to generate an intermediate image, and the intermediate image inherits a same style as the second image. At block 530, a second learning network for style transfer from the first image domain to the second image domain is determined based on the first image and the intermediate image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN), and determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, wherein the updated first sub-network is determined as the first learning network.

In some implementations, updating the first sub-network of the first GAN further comprises: performing, by using a second sub-network of the first GAN, the geometric deformation from the second image domain to the first image domain on the second image, to deform a second geometry of an object in the second image to a second deformed geometry; determining a third difference between the second geometry and the second average geometry and a fourth difference between the second deformed geometry and the first average geometry; and jointly updating the first and second sub-networks of the first GAN such that a difference between the third and fourth differences is also decreased.

In some implementations, performing the geometric deformation from the second image domain to the first image domain comprises: performing the geometric deformation from the second image domain to the first image domain by using the updated second sub-network.

In some implementations, the second learning network is based on a second generative adversarial network (GAN), and wherein determining the second learning network comprises: performing, by using a first sub-network of the second GAN, style transfer from the first image domain to the second image domain on the first image, to transfer the first image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the intermediate image, to transfer the intermediate image with a third style to a second predicted image with a fourth style, the fourth style being randomly selected from a plurality of styles in the first image domain; and jointly updating the first and second sub-networks of the second GAN such that a difference in content between the second predicted image and the intermediate image is decreased.

Figure 5B:
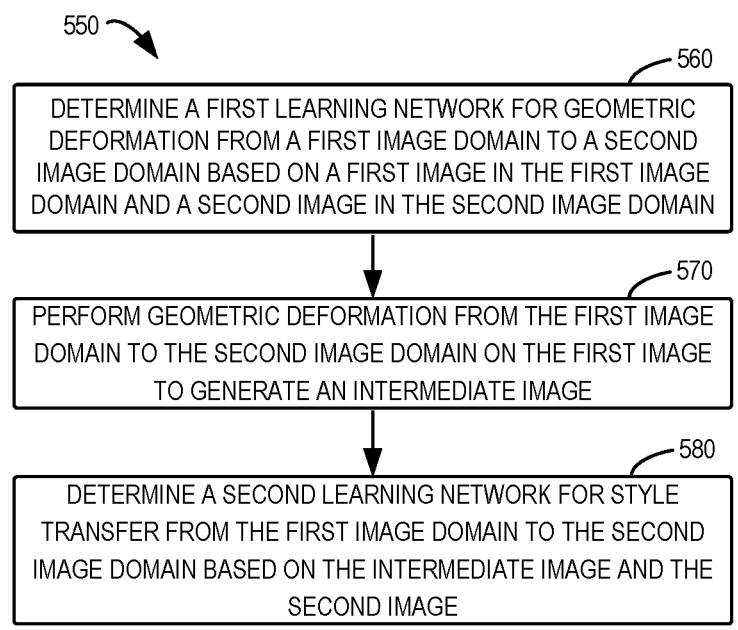
FIG. 5B illustrates a flowchart of a process for cross-domain image translation according to another implementation of the subject matter described herein.

FIG. 5B illustrates a flowchart of a process 550 of training a learning network according to some implementations of the subject matter as described herein. The process 550 may be implemented by the computing device 100 or other devices or device clusters similar to the computing device 100.

At block 560, a first learning network for geometric deformation from a first image domain to a second image domain is determined based on a first image in the first image domain and a second image in the second image domain. Images in the first and second image domains have different styles and objects in the images have geometric deformation with respect to each other. At block 570, geometric deformation from the first image domain to the second image domain is performed on the first image to generate an intermediate image, the intermediate image inheriting a same style as the first image. At block 589, a second learning network for style transfer from the first image domain to the second image domain is determined based on the intermediate image and the second image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN). Determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, where the updated first sub-network is determined as the first learning network.

In some implementations, updating the first sub-network of the first GAN comprises: performing, by using a second sub-network of the first GAN, the geometric deformation from the second image domain to the first image domain on the second image, to deform a second geometry of an object in the second image to a second deformed geometry; determining a third difference between the second geometry and a second average geometry and a fourth difference between the second deformed geometry and a first average geometry; and jointly updating the first and second sub-networks of the first GAN such that a difference between the third and fourth differences is decreased.

In some implementations, performing geometric deformation from the second image domain to the first image domain comprises: performing geometric deformation from the second image domain to the first image domain by using the updated second sub-network.

In some implementations, the second learning network is based on a second generative adversarial network (GAN). Determining the second learning network comprises: performing, by using a first sub-network of the second GAN, style transfer from the first image domain to the second image domain on the intermediate image, to transfer the intermediate image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the second image, to transfer the second image with a third style to a second predicted image with a fourth style, the fourth style being randomly selected from a plurality of styles in the first image domain; and jointly updating the first and second sub-networks of the second GAN such that a difference in content between the second predicted image and the second image is decreased.

Figure 6A:
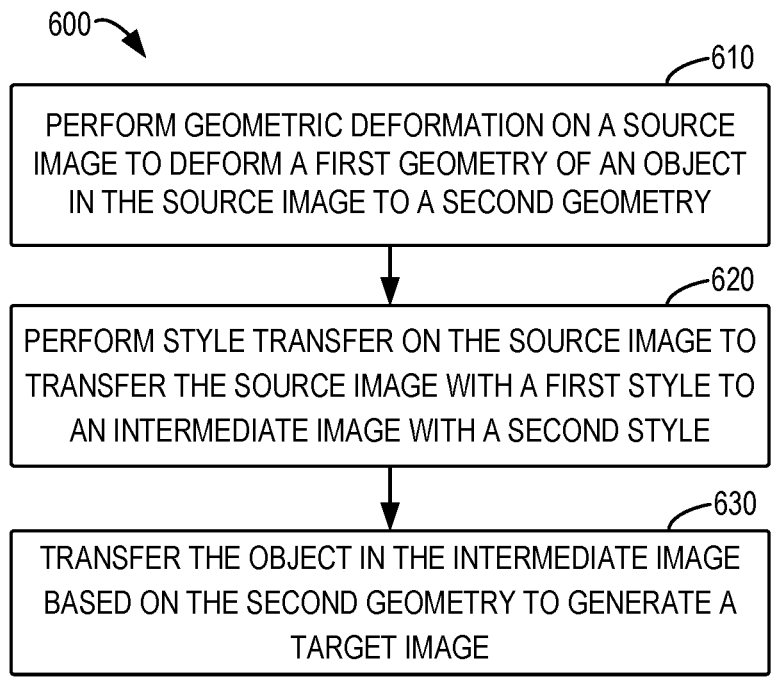
FIG. 6A illustrates a flowchart of a process for training a learning network according to an implementation of the subject matter described herein.

FIG. 6A illustrates a flowchart of a process 600 for cross-domain image translation according to some implementations of the subject matter as described herein. The process 600 may be implemented by the computing device 100, e.g., implemented at the image translation module 122 in the memory 120 of the computing device 100.

At block 610, geometric deformation is performed on a source image to deform a first geometry of an object in the source image to a second geometry. At block 620, style transfer is performed on the source image to transfer the source image with a first style to an intermediate image with a second style. At block 630, the object in the intermediate image is transferred based on the second geometry to generate a target image, the target image inheriting a same second style as the intermediate image.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a generative adversarial network (GAN). In some implementations, performing the style transfer comprises performing the style transfer by using a second learning network, the second learning network being determined based on another generative adversarial network (GAN).

Figure 6B:
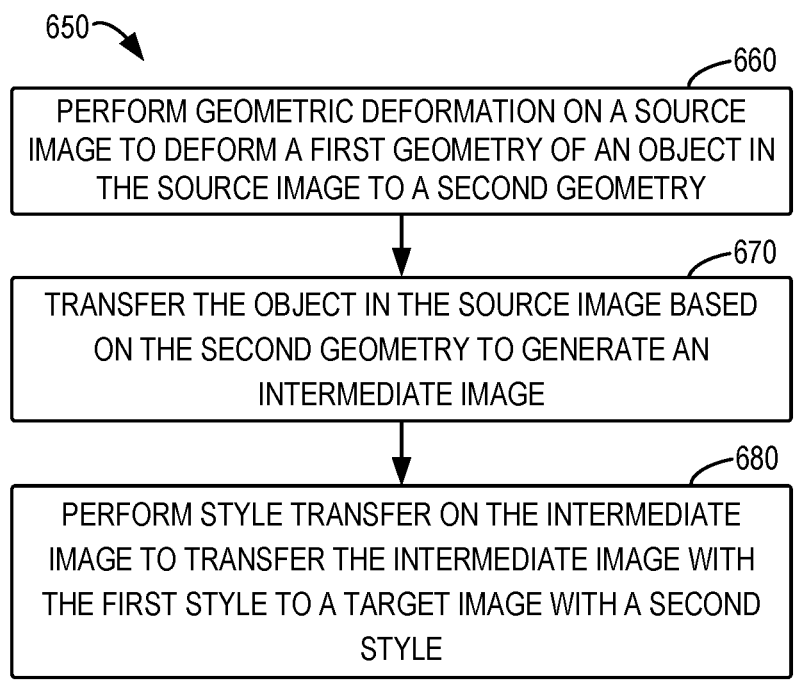
FIG. 6B illustrates a flowchart of a process for training a learning network according to another implementation of the subject matter described herein.

FIG. 6B illustrates a flowchart of a process 650 for cross-domain image translation according to some implementations of the subject matter as described herein. The process 650 may be implemented by the computing device 100, e.g., implemented at the image translation module 122 in the memory 120 of the computing device 100.

At block 660, geometric deformation is performed on a source image to deform a first geometry of an object in the source image to a second geometry. At block 670, the object in the source image is transferred based on the second geometry to generate an intermediate image, the intermediate image inheriting a same first style as the source image.

At block 680, style transfer is performed on the intermediate image to transfer the intermediate image with the first style to a target image with a second style.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a generative adversarial network (GAN). In some implementations, performing the style transfer comprises performing the style transfer by using a second learning network, the second learning network being determined based on another generative adversarial network (GAN).

Example Implementations

Some example implementations of the subject matter described herein are listed below.

In one aspect, the subject matter described herein provides a computer-implemented method, comprising: determining a first learning network for geometric deformation from a first image domain to a second image domain based on a first image in the first image domain and a second image in the second image domain, images in the first and second image domains having different styles and objects in the images having geometric deformation with respect to each other; performing the geometric deformation from the second image domain to the first image domain on the second image to generate an intermediate image, the intermediate image inheriting a same style as the second image; and determining a second learning network for style transfer from the first image domain to the second image domain based on the first image and the intermediate image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN), and wherein determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, where the updated first sub-network is determined as the first learning network.

In some implementations, updating the first sub-network of the first GAN further comprises: performing, by using a second sub-network of the first GAN, the geometric deformation from the second image domain to the first image domain on the second image, to deform a second geometry of an object in the second image to a second deformed geometry; determining a third difference between the second geometry and the second average geometry and a fourth difference between the second deformed geometry and the first average geometry; and jointly updating the first and second sub-networks of the first GAN such that a difference between the third and fourth differences is also decreased.

In some implementations, performing the geometric deformation from the second image domain to the first image domain comprises: performing the geometric deformation from the second image domain to the first image domain by using the updated second sub-network.

In some implementations, the second learning network is based on a second generative adversarial network (GAN), and where determining the second learning network comprises: performing, by using a first sub-network of the second GAN, style transfer from the first image domain to the second image domain on the first image, to transfer the first image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the intermediate image, to transfer the intermediate image with a third style to a second predicted image with a fourth style, the fourth style being randomly selected from a plurality of styles in the first image domain; and jointly updating the first and second sub-networks of the second GAN such that a difference in content between the second predicted image and the intermediate image is decreased.

In a second aspect, the subject matter described herein provides an electronic device. The electronic device comprises a processing unit; and a memory coupled to the processing unit and having instructions stored thereon which, when executed by the processing unit, cause the device to perform acts of: determining a first learning network for geometric deformation from a first image domain to a second image domain based on a first image in the first image domain and a second image in the second image domain, images in the first and second image domains having different styles and objects in the images having geometric deformation with respect to each other; performing the geometric deformation from the second image domain to the first image domain on the second image to generate an intermediate image, the intermediate image inheriting a same style as the second image; and determining a second learning network for style transfer from the first image domain to the second image domain based on the first image and the intermediate image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN), and wherein determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, where the updated first sub-network is determined as the first learning network.

In some implementations, updating the first sub-network of the first GAN further comprises: performing, by using a second sub-network of the first GAN, the geometric deformation from the second image domain to the first image domain on the second image, to deform a second geometry of an object in the second image to a second deformed geometry; determining a third difference between the second geometry and the second average geometry and a fourth difference between the second deformed geometry and the first average geometry; and jointly updating the first and second sub-networks of the first GAN such that a difference between the third and fourth differences is also decreased.

In some implementations, performing the geometric deformation from the second image domain to the first image domain comprises: performing the geometric deformation from the second image domain to the first image domain by using the updated second sub-network.

In some implementations, the second learning network is based on a second generative adversarial network (GAN), and wherein determining the second learning network comprises: performing, by using a first sub-network of the second GAN, style transfer from the first image domain to the second image domain on the first image, to transfer the first image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the intermediate image, to transfer the intermediate image with a third style to a second predicted image with a fourth style, the fourth style being randomly selected from a plurality of styles in the first image domain; and jointly updating the first and second sub-networks of the second GAN such that a difference in content between the second predicted image and the intermediate image is decreased.

In a third aspect, the subject matter described herein provides a computer-implemented method. The method comprises: determining a first learning network for geometric deformation from a first image domain to a second image domain based on a first image in the first image domain and a second image in the second image domain, images in the first and second image domains having different styles and objects in the images having geometric deformation with respect to each other; performing geometric deformation from the first image domain to the second image domain on the first image to generate an intermediate image, the intermediate image inheriting a same style as the first image; and determining a second learning network for style transfer from the first image domain to the second image domain based on the intermediate image and the second image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN). Determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, where the updated first sub-network is determined as the first learning network.

In some implementations, updating the first sub-network of the first GAN comprises: performing, by using a second sub-network of the first GAN, the geometric deformation from the second image domain to the first image domain on the second image, to deform a second geometry of an object in the second image to a second deformed geometry; determining a third difference between the second geometry and a second average geometry and a fourth difference between the second deformed geometry and a first average geometry;

and jointly updating the first and second sub-networks of the first GAN such that a difference between the third and fourth differences is decreased.

In some implementations, performing geometric deformation from the second image domain to the first image domain comprises: performing geometric deformation from the second image domain to the first image domain by using the updated second sub-network.

In some implementations, the second learning network is based on a second generative adversarial network (GAN). Determining the second learning network comprises: performing, by using a first sub-network of the second GAN, style transfer from the first image domain to the second image domain on the intermediate image, to transfer the intermediate image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the second image, to transfer the second image with a third style to a second predicted image with a fourth style, the fourth style being randomly selected from a plurality of styles in the first image domain; and jointly updating the first and second sub-networks of the second GAN such that a difference in content between the second predicted image and the second image is decreased.

In a fourth aspect, the subject matter described herein provides an electronic device. The electronic device comprises a processing unit; and a memory coupled to the processing unit and having instructions stored thereon which, when executed by the processing unit, cause the device to perform acts of: determining a first learning network for geometric deformation from a first image domain to a second image domain based on a first image in the first image domain and a second image in the second image domain, images in the first and second image domains having different styles and objects in the images having geometric deformation with respect to each other; performing geometric deformation from the first image domain to the second image domain on the first image to generate an intermediate image, the intermediate image inheriting a same style as the first image; and determining a second learning network for style transfer from the first image domain to the second image domain based on the intermediate image and the second image.

In some implementations, determining the first learning network comprises: extracting first landmark points of a geometry of an object in the first image and second landmark points of a geometry of an object in the second image; determining a first principal component analysis (PCA) representation of the first landmark points and a second PCA representation of the second landmark points; and determining the first learning network based on the first and second PCA representations.

In some implementations, the first learning network is based on a first generative adversarial network (GAN). Determining the first learning network comprises: performing, by using a first sub-network of the first GAN, geometric deformation from the first image domain to the second image domain on the first image, to deform a first geometry of an object in the first image to a first deformed geometry; determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, wherein the updated first sub-network is determined as the first learning network.

In some implementations, updating the first sub-network of the first GAN comprises: performing, by using a second sub-network of the first GAN, the geometric deformation from the second image domain to the first image domain on the second image, to deform a second geometry of an object in the second image to a second deformed geometry; determining a third difference between the second geometry and a second average geometry and a fourth difference between the second deformed geometry and a first average geometry; and jointly updating the first and second sub-networks of the first GAN such that a difference between the third and fourth differences is decreased.

In some implementations, performing geometric deformation from the second image domain to the first image domain comprises: performing geometric deformation from the second image domain to the first image domain by using the updated second sub-network.

In some implementations, the second learning network is based on a second generative adversarial network (GAN). Determining the second learning network comprises: performing, by using a first sub-network of the second GAN, style transfer from the first image domain to the second image domain on the intermediate image, to transfer the intermediate image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

In some implementations, updating the first sub-network of the second GAN further comprises: performing, by using a second sub-network of the second GAN, style transfer from the second image domain to the first image domain on the second image, to transfer the second image with a third style to a second predicted image with a fourth style, the fourth style being randomly selected from a plurality of styles in the first image domain; and jointly updating the first and second sub-networks of the second GAN such that a difference in content between the second predicted image and the second image is decreased.

In a fifth aspect, the subject matter described herein provides a computer-implemented method. The method comprises: performing geometric deformation on a source image to deform a first geometry of an object in the source image to a second geometry; performing style transfer on the source image to transfer the source image with a first style to an intermediate image with a second style; and transferring the object in the intermediate image based on the second geometry to generate a target image, the target image inheriting a same second style as the intermediate image.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a generative adversarial network (GAN). In some implementations, performing the style transfer comprises performing the style transfer by using a second learning network, the second learning network being determined based on another generative adversarial network (GAN).

In a sixth aspect, the subject matter described herein provides an electronic device. The electronic device comprises: a processing unit; and a memory coupled to the processing unit and having instructions stored thereon which, when executed by the processing unit, cause the device to perform acts of: performing geometric deformation on a source image to deform a first geometry of an object in the source image to a second geometry; performing style transfer on the source image to transfer the source image with a first style to an intermediate image with a second style; and transferring the object in the intermediate image based on the second geometry to generate a target image, the target image inheriting a same second style as the intermediate image.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a first generative adversarial network (GAN). In some implementations, performing the style transfer comprises performing the style transfer by using a second learning network, the second learning network being determined based on a second GAN network.

In a seventh aspect, the subject matter described herein provides a computer-implemented method. The method comprises: performing geometric deformation on a source image to deform a first geometry of an object in the source image to a second geometry; transferring the object in the source image based on the second geometry to generate an intermediate image, the intermediate image inheriting a same first style as the source image; and performing style transfer on the intermediate image to transfer the intermediate image with the first style to a target image with a second style.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a generative adversarial network (GAN). In some implementations, performing the style transfer comprises performing the style transfer by using a second learning network, the second learning network being determined based on another generative adversarial network (GAN).

In an eighth aspect, the subject matter described herein provides an electronic device. The electronic device comprises a processing unit; and a memory coupled to the processing unit and having instructions stored thereon which, when executed by the processing unit, cause the device to perform acts of: performing geometric deformation on a source image to deform a first geometry of an object in the source image to a second geometry; transferring the object in the source image based on the second geometry to generate an intermediate image, the intermediate image inheriting a same first style as the source image; and performing style transfer on the intermediate image to transfer the intermediate image with the first style to a target image with a second style.

In some implementations, performing the geometric deformation comprises: determining landmark points in the source image that represent the first geometry; generating a principal component analysis (PCA) representation of the landmark points; performing the geometric deformation on the PCA representation; and determining deformed landmark points representing the second geometry based on the deformed PCA representation.

In some implementations, performing the geometric deformation comprises: obtaining an indication of a deformation degree of the object; and transferring the first geometry to the second geometry based on the deformation degree.

In some implementations, performing style transfer on the source image comprises: extracting a content-related feature representation of the source image; determining an appearance-related feature representation associated with the second style; and generating the intermediate image based on the content-related feature representation and the appearance-related feature representation.

In some implementations, determining the appearance-related feature representation comprises: randomly selecting the appearance-related feature representation from a plurality of predetermined appearance-related feature representations; or determining the appearance-related feature representation based on an obtained indication related to the second style or a reference image with the second style.

In some implementations, performing the geometric deformation comprises performing the geometric deformation by using a first learning network, the first learning network being determined based on a first generative adversarial network (GAN). In some implementations, performing the style transfer comprises performing the style transfer by using a second learning network, the second learning network being determined based on a second GAN network.

In a tenth aspect, the subject matter described herein provides a computer program product tangibly stored on a non-transitory computer storage medium and comprising machine-executable instructions which, when executed by a device, cause the device to perform the method according to any of the above aspects.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   determining a first learning network for geometric deformation from a first image domain to a second image domain based on a first image in the first image domain and a second image in the second image domain, images in the first and second image domains having different styles and objects in the images having geometric deformation with respect to each other, wherein the first learning network is based on a first generative adversarial network (GAN), and wherein determining the first learning network comprises:
   performing, by using a first sub-network of the first GAN, geometric deformation from the first image domain to the second image domain on the first image, to deform a first geometry of an object in the first image to a first deformed geometry;
   determining a first difference between the first geometry and a first average geometry and a second difference between the first deformed geometry and a second average geometry, the first average geometry being an average of geometries of objects in a plurality of images in the first image domain, and the second average geometry being an average of geometries of objects in a plurality of images in the second image domain; and updating the first sub-network of the first GAN such that a difference between the first and second differences is decreased, wherein the updated first sub-network is determined as the first learning network;

performing the geometric deformation from the second image domain to the first image domain on the second image to generate an intermediate image, the intermediate image inheriting a same style as the second image; and determining a second learning network for style transfer from the first image domain to the second image domain based on the first image and the intermediate image.

2. The method of claim 1, wherein determining the first learning network comprises:

extracting first landmark points of a geometry of an object in the first image and second landmark points of a geometry of an object in the second image;

determining a first principal component analysis (PCA) representation of the first landmark points and a second PCA representation of the second landmark points; and determining the first learning network based on the first and second PCA representations.

3. The method of claim 1, wherein updating the first sub-network of the first GAN further comprises:

performing, by using a second sub-network of the first GAN, the geometric deformation from the second image domain to the first image domain on the second image, to deform a second geometry of an object in the second image to a second deformed geometry;

determining a third difference between the second geometry and the second average geometry and a fourth difference between the second deformed geometry and the first average geometry; and jointly updating the first and second sub-networks of the first GAN such that a difference between the third and fourth differences is also decreased.

4. The method of claim 3, wherein performing the geometric deformation from the second image domain to the first image domain comprises:

performing the geometric deformation from the second image domain to the first image domain by using the updated second sub-network.

5. The method of claim 1, wherein the second learning network is based on a second generative adversarial network (GAN), and wherein determining the second learning network comprises:

performing, by using a first sub-network of the second GAN, style transfer from the first image domain to the second image domain on the first image, to transfer the first image with a first style to a first predicted image with a second style, the second style being randomly selected from a plurality of styles in the second image domain; and updating the first sub-network of the second GAN such that a difference in content between the first predicted image and the first image is decreased, wherein the updated first sub-network is determined as the second learning network.

6. The method of claim 5, wherein updating the first sub-network of the second GAN further comprises:

performing, by using a second sub-network of the second GAN, style transfer from the second image domain to the first image domain on the intermediate image, to transfer the intermediate image with a third style to a second predicted image with a fourth style, the fourth style being randomly selected from a plurality of styles in the first image domain; and jointly updating the first and second sub-networks of the second GAN such that a difference in content between the second predicted image and the intermediate image is decreased.

7. A computer-implemented method, comprising:

performing geometric deformation on a source image to deform a first geometry of an object in the source image to a second geometry;

performing style transfer on the source image to transfer the source image with a first style to an intermediate image with a second style; and generating a target image based on the second geometry of the source image and the second style of the intermediate image by performing image warping on the intermediate image under the guidance of the deformed second geometry such that an object in the target image has the second geometry while the style of the target image remains consistent with the second style of the intermediate image.

8. The method of claim 7, wherein performing the geometric deformation comprises:

determining landmark points in the source image that represent the first geometry;

generating a principal component analysis (PCA) representation of the landmark points;

performing the geometric deformation on the PCA representation; and determining deformed landmark points representing the second geometry based on the deformed PCA representation.

9. The method of claim 7, wherein performing the geometric deformation comprises:

obtaining an indication of a deformation degree of the object; and transferring the first geometry to the second geometry based on the deformation degree.

10. The method of claim 7, wherein performing style transfer on the source image comprises:

extracting a content-related feature representation of the source image;

determining an appearance-related feature representation associated with the second style; and generating the intermediate image based on the content-related feature representation and the appearance-related feature representation.

11. The method of claim 10, wherein determining the appearance-related feature representation comprises:

randomly selecting the appearance-related feature representation from a plurality of predetermined appearance-related feature representations; or determining the appearance-related feature representation based on an obtained indication related to the second style or a reference image with the second style.

12. The method of claim 7, wherein performing the geometric deformation comprises performing the geometric deformation by using a first learning network, the first learning network being determined based on a first generative adversarial network (GAN); or wherein performing the style transfer comprises performing the style transfer by using a second learning network, the second learning network being determined based on a second GAN network.

* * * * *